United States Patent
Engelberg et al.

(10) Patent No.: US 12,348,552 B2
(45) Date of Patent: Jul. 1, 2025

(54) AUTOMATED PREDICTION OF CYBER-SECURITY ATTACK TECHNIQUES USING KNOWLEDGE MESH

(71) Applicant: Accenture Global Solutions Limited, Dublin (IE)

(72) Inventors: Gal Engelberg, Pardes-hana (IL); Dan Klein, Rosh HaAyim (IL); Moshe Hadad, Rosh HaAyim (IL); Hodaya Binyamini, Beer Sheva (IL)

(73) Assignee: Accenture Global Solutions Limited, Dublin (IE)

( * ) Notice: Subject to any disclaimer, the term of this patent is extended or adjusted under 35 U.S.C. 154(b) by 238 days.

(21) Appl. No.: 18/335,305

(22) Filed: Jun. 15, 2023

(65) Prior Publication Data

US 2023/0412634 A1    Dec. 21, 2023

Related U.S. Application Data

(60) Provisional application No. 63/410,698, filed on Sep. 28, 2022, provisional application No. 63/352,471, filed on Jun. 15, 2022.

(51) Int. Cl.
| | | |
|---|---|---|
| H04L 9/40 | (2022.01) | |
| G06N 5/04 | (2023.01) | |
| H04L 41/02 | (2022.01) | |
| H04L 41/16 | (2022.01) | |

(52) U.S. Cl.
CPC ........... *H04L 63/1433* (2013.01); *G06N 5/04* (2013.01); *H04L 41/024* (2013.01); *H04L 41/16* (2013.01)

(58) Field of Classification Search
CPC ... H04L 63/1433; H04L 41/024; H04L 41/16; H04L 41/145; H04L 41/147; H04L 41/22; G06N 5/04; G06N 5/022; G06N 20/00
See application file for complete search history.

(56) References Cited

U.S. PATENT DOCUMENTS

| | | |
|---|---|---|
| 5,521,910 A | 5/1996 | Matthews |
| 6,279,113 B1 | 8/2001 | Vaidya |
| 6,487,666 B1 | 11/2002 | Shanklin et al. |
| 7,540,025 B2 | 5/2009 | Tzadikario |
| 7,703,138 B2 | 4/2010 | Desai et al. |
| 7,904,962 B1 | 3/2011 | Jajodia et al. |
| 8,099,760 B2 | 1/2012 | Cohen et al. |
| 8,176,561 B1 | 5/2012 | Hurst et al. |
| 8,656,493 B2 | 2/2014 | Capalik |
| 8,881,288 B1 | 11/2014 | Levy et al. |
| 9,256,739 B1 | 2/2016 | Roundy et al. |
| 9,563,771 B2 | 2/2017 | Lang et al. |
| 9,633,306 B2 | 4/2017 | Liu et al. |
| 10,084,804 B2 | 9/2018 | Kapadia et al. |
| 10,291,645 B1 | 5/2019 | Frantzen et al. |
| 10,382,473 B1 | 8/2019 | Ashkenazy et al. |
| 10,447,721 B2 | 10/2019 | Lasser |
| 10,447,727 B1 | 10/2019 | Hecht |
| 10,601,854 B2 | 3/2020 | Lokamathe et al. |
| 10,642,840 B1 | 5/2020 | Attaluri et al. |
| 10,659,488 B1 | 5/2020 | Rajasooriya et al. |
| 10,771,492 B2 | 9/2020 | Hudis et al. |
| 10,848,515 B1 | 11/2020 | Pokhrel et al. |
| 10,868,825 B1 | 12/2020 | Dominessy et al. |
| 10,873,533 B1 | 12/2020 | Ismailsheriff et al. |
| 10,956,566 B2 | 3/2021 | Shu et al. |
| 10,958,667 B1 | 3/2021 | Maida et al. |
| 11,089,040 B2 | 8/2021 | Jang et al. |
| 11,128,654 B1 | 9/2021 | Joyce et al. |
| 11,159,555 B2 | 10/2021 | Hadar et al. |
| 11,184,385 B2 | 11/2021 | Hadar et al. |
| 11,232,235 B2 | 1/2022 | Hadar et al. |
| 11,277,431 B2 | 3/2022 | Hassanzadeh et al. |
| 11,281,806 B2 | 3/2022 | Hadar et al. |

(Continued)

FOREIGN PATENT DOCUMENTS

| | | |
|---|---|---|
| EP | 1559008 | 8/2005 |
| EP | 1768043 | 3/2007 |

(Continued)

OTHER PUBLICATIONS

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

Abraham et al. "A Predictive Framework for Cyber Security Analytics Using Attack Graphs." International Journal of Computer Networks & Communications (IJCNC). Vol. 7, No. 1, Jan. 2015. (Year: 2015).

Abraham et al., "Cyber Security Analytics: A Stochastic Model for Security Quantification Using Absorbing Markov Chains," Journal of Communications, Dec. 2014, 9(12):899-907.

Almeida et al., "An ontological analysis of the notion of community in the RM-ODP enterprise language," Computer Standards & Interfaces, Mar. 2013, 35(3):257-268.

(Continued)

*Primary Examiner* — Brian Whipple
(74) *Attorney, Agent, or Firm* — Polsinelli PC

(57) ABSTRACT

Implementations include a computer-implemented method for reducing cyber-security risk, comprising: selecting one or more modules for inclusion in a knowledge mesh, wherein each module is associated with a respective aspect and maintains a knowledge graph specific to the respective aspect, wherein each knowledge graph is generated using data from one or more cyber-security repositories and includes nodes and connections between the nodes; receiving a query corresponding to a first node of a first knowledge graph included in the knowledge mesh; generating a response to the query by identifying connections between the first node of the first knowledge graph and at least one node of at least one other knowledge graph included in the knowledge mesh; and identifying, based on the response to the query, one or more actions to reduce cyber-security risk.

20 Claims, 16 Drawing Sheets

(56) References Cited

U.S. PATENT DOCUMENTS

| | | |
|---|---|---|
| 11,283,824 B1 | 3/2022 | Berger et al. |
| 11,283,825 B2 | 3/2022 | Grabois et al. |
| 11,411,976 B2 | 8/2022 | Basovskiy et al. |
| 11,483,213 B2 | 10/2022 | Engelberg et al. |
| 11,533,332 B2 | 12/2022 | Engelberg et al. |
| 2005/0138413 A1 | 6/2005 | Lippmann et al. |
| 2005/0193430 A1 | 9/2005 | Cohen et al. |
| 2006/0037077 A1 | 2/2006 | Gadde et al. |
| 2008/0044018 A1 | 2/2008 | Scrimsher et al. |
| 2008/0289039 A1 | 11/2008 | Rits et al. |
| 2008/0301765 A1 | 12/2008 | Nicol et al. |
| 2009/0077666 A1 | 3/2009 | Chen et al. |
| 2009/0138590 A1 | 5/2009 | Lee et al. |
| 2009/0307772 A1 | 12/2009 | Markham et al. |
| 2009/0319248 A1 | 12/2009 | White et al. |
| 2010/0058456 A1 | 3/2010 | Jajodia et al. |
| 2010/0138925 A1 | 7/2010 | Barai et al. |
| 2010/0174670 A1 | 7/2010 | Malik et al. |
| 2011/0035803 A1 | 2/2011 | Lucangeli Obes et al. |
| 2011/0061104 A1 | 3/2011 | Sarraute Yamada et al. |
| 2011/0093916 A1 | 4/2011 | Lang et al. |
| 2011/0093956 A1 | 4/2011 | Laarakkers et al. |
| 2013/0097125 A1 | 4/2013 | Marvasti et al. |
| 2013/0219503 A1 | 8/2013 | Amnon et al. |
| 2014/0082738 A1 | 3/2014 | Bahl |
| 2014/0173740 A1 | 6/2014 | Albanese et al. |
| 2015/0047026 A1 | 2/2015 | Neil et al. |
| 2015/0106867 A1 | 4/2015 | Liang |
| 2015/0199207 A1 | 7/2015 | Lin et al. |
| 2015/0261958 A1 | 9/2015 | Hale et al. |
| 2015/0326601 A1 | 11/2015 | Grondin et al. |
| 2015/0350018 A1 | 12/2015 | Hui et al. |
| 2016/0105454 A1 | 4/2016 | Li et al. |
| 2016/0205122 A1 | 7/2016 | Bassett |
| 2016/0277423 A1 | 9/2016 | Apostolescu et al. |
| 2016/0292599 A1 | 10/2016 | Andrews et al. |
| 2016/0301704 A1 | 10/2016 | Hassanzadeh et al. |
| 2016/0301709 A1 | 10/2016 | Hassanzadeh et al. |
| 2017/0012836 A1 | 1/2017 | Tongaonkar et al. |
| 2017/0032130 A1 | 2/2017 | Joseph et al. |
| 2017/0041334 A1 | 2/2017 | Kahn et al. |
| 2017/0078322 A1 | 3/2017 | Seiver et al. |
| 2017/0085595 A1 | 3/2017 | Ng et al. |
| 2017/0163506 A1 | 6/2017 | Keller |
| 2017/0230410 A1 | 8/2017 | Hassanzadeh et al. |
| 2017/0318050 A1 | 11/2017 | Hassanzadeh et al. |
| 2017/0324768 A1 | 11/2017 | Crabtree et al. |
| 2017/0364702 A1 | 12/2017 | Goldfarb et al. |
| 2017/0366416 A1 | 12/2017 | Beecham et al. |
| 2018/0013771 A1 | 1/2018 | Crabtree et al. |
| 2018/0103052 A1 | 4/2018 | Choudhury et al. |
| 2018/0152468 A1 | 5/2018 | Nor et al. |
| 2018/0159890 A1 | 6/2018 | Warnick et al. |
| 2018/0183827 A1 | 6/2018 | Zorlular et al. |
| 2018/0255077 A1 | 9/2018 | Paine |
| 2018/0255080 A1 | 9/2018 | Paine |
| 2018/0295154 A1 | 10/2018 | Crabtree et al. |
| 2018/0367548 A1 | 12/2018 | Stokes, III et al. |
| 2019/0052663 A1 | 2/2019 | Lee et al. |
| 2019/0052664 A1 | 2/2019 | Kibler et al. |
| 2019/0132344 A1 | 5/2019 | Lem et al. |
| 2019/0141058 A1 | 5/2019 | Hassanzadeh et al. |
| 2019/0182119 A1 | 6/2019 | Ratkovic et al. |
| 2019/0188389 A1 | 6/2019 | Peled et al. |
| 2019/0230129 A1 | 7/2019 | Digiambattista et al. |
| 2019/0312898 A1 | 10/2019 | Verma et al. |
| 2019/0319987 A1 | 10/2019 | Levy et al. |
| 2019/0362279 A1 | 11/2019 | Douglas |
| 2019/0373005 A1 | 12/2019 | Bassett |
| 2020/0014718 A1 | 1/2020 | Joseph Durairaj et al. |
| 2020/0042328 A1 | 2/2020 | Gupta |
| 2020/0042712 A1 | 2/2020 | Foo et al. |
| 2020/0045069 A1 | 2/2020 | Nanda et al. |
| 2020/0099704 A1 | 3/2020 | Lee et al. |
| 2020/0112487 A1 | 4/2020 | Inamdar et al. |
| 2020/0128047 A1 | 4/2020 | Biswas et al. |
| 2020/0137104 A1 | 4/2020 | Hassanzadeh et al. |
| 2020/0175175 A1 | 6/2020 | Hadar et al. |
| 2020/0177615 A1 | 6/2020 | Grabois et al. |
| 2020/0177616 A1 | 6/2020 | Hadar et al. |
| 2020/0177617 A1 | 6/2020 | Hadar et al. |
| 2020/0177618 A1 | 6/2020 | Hassanzadeh et al. |
| 2020/0177619 A1 | 6/2020 | Hadar et al. |
| 2020/0272972 A1 | 8/2020 | Harry et al. |
| 2020/0296137 A1 | 9/2020 | Crabtree et al. |
| 2020/0311630 A1 | 10/2020 | Risoldi et al. |
| 2020/0351295 A1 | 11/2020 | Nhlabatsi et al. |
| 2020/0358804 A1 | 11/2020 | Crabtree et al. |
| 2021/0006582 A1 | 1/2021 | Yamada et al. |
| 2021/0014265 A1 | 1/2021 | Hadar et al. |
| 2021/0099490 A1 | 4/2021 | Crabtree et al. |
| 2021/0105294 A1 | 4/2021 | Kruse et al. |
| 2021/0168175 A1 | 6/2021 | Crabtree et al. |
| 2021/0173711 A1 | 6/2021 | Crabtree et al. |
| 2021/0218770 A1 | 7/2021 | Ben-Yosef et al. |
| 2021/0248443 A1 | 8/2021 | Shu et al. |
| 2021/0273978 A1 | 9/2021 | Hadar et al. |
| 2021/0288995 A1 | 9/2021 | Attar et al. |
| 2021/0336981 A1 | 10/2021 | Akella et al. |
| 2021/0409426 A1 | 12/2021 | Engelberg et al. |
| 2021/0409439 A1 | 12/2021 | Engelberg et al. |
| 2022/0014445 A1 | 1/2022 | Engelberg et al. |
| 2022/0014534 A1 | 1/2022 | Basovskiy et al. |
| 2022/0021698 A1 | 1/2022 | Hadar et al. |
| 2022/0038491 A1 | 2/2022 | Hadar et al. |
| 2022/0051111 A1 | 2/2022 | Hadar et al. |
| 2022/0070202 A1 | 3/2022 | Busany et al. |
| 2022/0124115 A1 | 4/2022 | Grabois et al. |
| 2022/0129590 A1 | 4/2022 | Hadar et al. |
| 2022/0131894 A1 | 4/2022 | Hassanzadeh et al. |
| 2022/0150270 A1 | 5/2022 | Klein et al. |
| 2022/0182406 A1 | 6/2022 | Inokuchi |
| 2022/0188460 A1 | 6/2022 | Hadar et al. |
| 2022/0263855 A1 | 8/2022 | Engelberg et al. |
| 2022/0337617 A1 | 10/2022 | Basovskiy et al. |
| 2023/0021961 A1 | 1/2023 | Engelberg et al. |
| 2023/0034910 A1 | 2/2023 | Engelberg et al. |
| 2023/0067128 A1 | 3/2023 | Engelberg et al. |
| 2023/0067777 A1 | 3/2023 | Hadar et al. |
| 2023/0076372 A1 | 3/2023 | Engelberg et al. |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| WO | WO 2018/002484 | 1/2018 |
| WO | WO 2020/242275 | 12/2020 |

OTHER PUBLICATIONS

Alvarenga et al., "Discovering Attack Strategies Using Process Mining," Presented at Proceedings of the Eleventh Advanced International Conference on Telecommunications, Brussels, Belgium, Jun. 21-26, 2015, 119-125.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.

Ashton et al., "That 'internet of things' thing," RFID Journal, Jun. 22, 2009, 1 page.

Atoum et al., "A holistic cyber security implementation framework," Information Management & Computer Security, Jul. 2014, 22(3):251-264.

Barik et al., "Attack Graph Generation and Analysis Techniques," Defence Science Journal, Nov. 2016, 66(6):559-567.

(56) References Cited

OTHER PUBLICATIONS

Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.
Bonacich, "Power and Centrality: A Family of Measures," American Journal of Sociology, Mar. 1987, 92(5):1170-1182.
Borgatti et al., "A Graph-theoretic perspective on centrality," Social Networks, Oct. 2006, 28(4):466-484.
Borgo et al., "Ontological Foundations of DOLCE," Theory and Applications of Ontology: Computer Applications, Aug. 5, 2010, 279-295.
Brazhuk, "Towards automation of threat modeling based on a semantic model of attack patterns and weaknesses," arXiv, Dec. 8, 2021, arXiv:2112.04231v1, 14 pages.
Burger et al., "Scaling to the end of silicon with edge architectures," Computer, Jul. 2004, 37(7):44-55.
Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.
Chen et al., "Distributed Attack Modeling Approach Based on Process Mining and Graph Segmentation," Entropy, Sep. 2020, 22(9):1026, 21 pages.
Chen Zhong, Towards Agile Cyber Analysis: Leveraging Visualization as Functions in Collaborative Visual Analytics, IEEE:2017, pp. 1-2.
Cohen-Addad et al., "Hierarchical Clustering: Objective Functions and Algorithms," Journal of the ACM, Jun. 2019, 66(4):26, 42 pages.
Coltellese et al., "Triage of IoT Attacks Through Process Mining," Presented at Proceedings of on the Move to Meaningful Internet Systems Conference 2019, Rhodes, Greece, Oct. 21-25, 2019; Lecture Notes in Computer Science, Oct. 2019, 11877:326-344.
Cravero, "Big data architectures and the internet of things: A systematic mapping study," IEEE Latin America Transactions, Apr. 2018, 16(4):1219-1226.
CyberSecurity Works.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.
Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.
Daniele et al., "An ontological approach to logistics," Enterprise Interoperability: Research and Applications in the Service-oriented Ecosystem, Oct. 11, 2013, 199-213.
Das et al., "V2W-BERT: A Framework for Effective Hierarchical Multiclass Classification of Software Vulnerabilities," CoRR, submitted on Feb. 23, 2021, arXiv:2102.11498v1, 11 pages.
Degen et al., "Go!: toward an axiomatized upper-level ontology," Presented at Proceedings of the International Conference on Formal Ontology in Information Systems, Ogunquit, Maine, USA, Oct. 17-19, 2001, 34-46.
Duarte et al., "Towards an Ontology of Requirements at Runtime," Formal Ontology in Information Systems, Jan. 2016, 283:255-268.
El Saddik, "Digital Twins: The Convergence of Multimedia Technologies," IEEE MultiMedia, Apr.-Jun. 2018, 25(2):87-92.
EP Extended Search Report in European Appln. No. 21191752.1, dated Jan. 4, 2022, 8 pages.
EP Extended Search Report in European Appln. No. 22157487.4, dated Jun. 9, 2022, 10 pages.
EP Extended Search Report in European Appln. No. 22187514.9, dated Nov. 29, 2022, 7 pages.
EP Extended Search Report in European Appln. No. 22193272.6, dated Jan. 25, 2023, 8 pages.
EP Search Report in European Application No. EP 19212981, dated Mar. 4, 2020, 6 pages.
EP Search Report in European Application No. EP19212974, dated Feb. 14, 2020, 8 pages.
EP Search Report in European Application No. EP19212976, dated Feb. 14, 2020, 8 pages.
EP Search Report in European Application. No. 21159421.3, dated Jun. 30, 2021, 11 pages.
EP Search Report in European Application. No. EP20185251, dated Oct. 21, 2020, 7 pages.
Fielder et al., "Decision support approaches for cyber security investment," Decision Support Systems, Jun. 2016, 86:13-23.
Foundations of Databases, 1st ed., Abiteboul et al. (eds.), 1995, Chapter 12, 38 pages.
Fundamentals of Business Process Management, 2nd ed., Dumas et al. (eds.), 2018, 546 pages.
Gailly et al., "Ontological Reengineering of the REA-EO using UFO," Presented at Proceedings of the International Workshop on Ontology-Driven Software Engineering, Orlando, FL, USA, Oct. 2009, 15 pages.
Gandomi et al., "Beyond the hype: Big data concepts, methods, and analytics," International Journal of Information Management, Apr. 2015, 35(2):137-144.
GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.
Genovese, "Data mesh: the newest paradigm shift for a distributed architecture in the data world and its application," Thesis for the degree of Computer Engineering, Politecnico di Torino, 2021, 76 pages.
Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.
GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.
Giunchiglia et al., "Lightweight Ontologies," Technical Report DIT-07-071, University of Trento, Oct. 2007, 10 pages.
Gomez-Perez et al., "Ontology languages for the Semantic Web," IEEE Intelligent Systems, Feb. 2002, 17(1):54-60.
Grieves, "Virtually Intelligent Product Systems: Digital and Physical Twins", Complex Systems Engineering: Theory and Practice, Jul. 2019, 256:175-200.
Grigorescu et al., "CVE2ATT&CK: BERT-Based Mapping of CVEs to MITRE ATT&CK Techniques," Algorithms, Aug. 31, 2022, 15(9):314, 22 pages.
Guarino, "Formal Ontology in Information Systems," Presented at Proceedings of the 1st International Conference, Trento, Italy, Jun. 6-8, 1998, 3-15.
Guizzardi et al., "An Ontology-Based Approach for Evaluating the Domain Appropriateness and Comprehensibility Appropriateness of Modeling Languages," MoDELS, 2005, 691-705.
Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.
Guizzardi, "Ontological Foundations for Structural Conceptual Models," Thesis for the degree of Doctor, University of Twente, 2005, 441 pages.
Guizzardi, "Ontology, Ontologies and the "I" of FAIR," Data Intelligence, Jan. 1, 2020, 2(1-2):181-191.
Guizzardi, "The role of foundational ontology for conceptual modeling and domain ontology representation," Presented at Proceed-

(56) References Cited

OTHER PUBLICATIONS ings of the 7th International Baltic Conference on Databases and Information Systems, Vilnius, Lithuania, Jul. 3-6, 2006, 9 pages.
Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.
Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.
Hansen et al., "Model-in-the-Loop and Software-in-the-Loop Testing of Closed-Loop Automotive Software with Arttest," Informatik, 2017, 13 pages.
Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.
Hassani et al., "Artificial Intelligence (AI) or Intelligence Augmentation (IA): What Is the Future?," AI, Apr. 12, 2020, 1(2):143-155.
Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.
Hemberg et al., "Using a Collated Cybersecurity Dataset for Machine Learning and Artificial Intelligence," arXiv, Aug. 5, 2021, arXiv:2108.02618v1, 5 pages.
Herre, "General Formal Ontology (GFO): A Foundational Ontology for Conceptual Modelling," Theory and Applications of Ontology: Computer Applications, Aug. 12, 2010, 297-345.
Hofner et al., "Dijkstra, Floyd and Warshall meet Kleene," Formal Aspects of Computing, Jul. 2012, 24(4-6):459-476.
Horrocks et al., "SWRL: A Semantic Web Rule Language Combining OWL and RuleML," W3C Member Submission, May 21, 2004, 24 pages.
Husák et al., "Survey of Attack Projection, Prediction, and Forecasting in Cyber Security," IEEE Communications Surveys & Tutorials, Sep. 24, 2018, 21(1):640-660.
Idika et al., "Extending attack graph-based security metrics and aggregating their application," IEEE Transactions on Dependable and Secure Computing, Jan./Feb. 2012, 9(1):75-85.
IEEE, "IEEE Standard for extensible Event Stream (XES) for Achieving Interoperability in Event Logs and Event Stream," IEEE Std 1849™-2016, Sep. 22, 2016, 50 pages.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Ingols et al., "Practical Attack Graph Generation for Network Defense," 2006 22nd Annual Computer Security Applications Conference (ACSAC'06), Miami Beach, Florida, Dec. 11-15, 2006, 10 pages.
International Organization for Standardization, "International Standard: ISO/IEC 27001," ISO/IEC 27001:2013(E), Oct. 1, 2013, 29 pages.
Jacobsen et al., "FAIR Principles: Interpretations and Implementation Considerations," Data Intelligence, Jan. 1, 2020, 2(1-2):10-29.
Joint Task Force Transformation Initiative, "Security and Privacy Controls for Federal Information Systems and Organizations," National Institute of Standards and Technology Special Publication 800-53, Revision 4, Jan. 22, 2015, 462 pages.
Kaloroumakis et al., "Toward a Knowledge Graph of Cybersecurity Countermeasures," Technical Report, The MITRE Corporation, 2021, 11 pages.
Khouzani et al., "Scalable min-max multi-objective cyber-security optimization over probabilistic attack graphs", European Journal of Operational Research, Nov. 1, 2019, 278(3):894-903.
Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.
Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.
Machado et al., "Data Mesh: Concepts and Principles of a Paradigm Shift in Data Architectures," Procedia Computer Science, 2022, 196:263-271.
Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.
Makridakis, "The forthcoming artificial intelligence (ai) revolution: Its impact on society and firms," Futures, Jun. 2017, 90:46-60.
Manning Free Content Center [online], "Building Your Vocabulary," dated May 19, 2017, retrieved on Jun. 3, 2020, retrieved from URL <https://freecontent.manning.com/building-your-vocabulary/>, 10 pages.
Martins et al., "A framework for conceptual characterization of ontologies and its application in the cybersecurity domain," Software and Systems Modeling, Jul. 2, 2022, 21:1437-1464.
Martins et al., "Conceptual Characterization of Cybersecurity Ontologies," The Practice of Enterprise Modelling, Nov. 18, 2020, 323-338.
MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.
Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.
Mathis, "Data lakes," Datenbank-Spektrum, Oct. 6, 2017, 17(3):289-293.
Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.
Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.
Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.
MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.
MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.
MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.
Monino, "Data Value, Big Data Analytics, and Decision-Making," Journal of the Knowledge Economy, Aug. 20, 2016, 256-267.
Murata, "Petri Nets: Properties, Analysis and Applications," Proceedings of the IEEE, Apr. 1989, 77(4):541-580.

(56) References Cited

OTHER PUBLICATIONS

Narmeen Zakaria Bawany; DDoS Attack Detection and Mitigation Using SDN: Methods, Practices, and Solutions; Springer—2017; p. 425-441.

National Institute of Standards and Technology [online], "National Vulnerability Database," last updated Jun. 2, 2020, retrieved on Jun. 3, 2020, retrieved from URL<https://nvd.nist.gov/>, 4 pages.

Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.

Neo4j.com [online], "Yen's K-Shortest Paths, available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/," retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

Networks: An Introduction, Newman (ed.), May 2010, 789 pages.

Noel et al., "CyGraph: Graph-Based Analytics and Visualization for Cybersecurity," Handbook of Statistics, Jan. 2016, 35:117-167.

Ortalo et al., "Experimenting with quantitative evaluation tools for monitoring operational security," IEEE Transactions on Software Engineering, Sep./Oct. 1999, 25(5):633-650.

Ou et al., "A Scalable Approach to Attack Graph Generation," Proceedings of the 13th ACM Conference on Computer and Communication Security, Oct. 2006, 336-345.

Ou et al., "MulVAL: A Logic-based Network Security Analyzer," 14th USENIX Security Symposium, Aug. 2005, Baltimore, MD, USA, 16 pages.

Phillips et al., "A graph-based system for network-vulnerability analysis," Proceedings of the 1998 Workshop on New Security Paradigms, Charlottesville, Virginia, Sep. 22-26, 1998, 71-79.

PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

Process Mining, 1st ed., van der Aalst, 2011, Chapters 5-6, 63 pages.

Purvine et al., "A Graph-Based Impact Metric for Mitigating Latheral Movement Cyber Attacks", Automated Descision Making for Active Cyber Defence, Oct. 2016, pp. 45-52.

Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).

Rossi et al., "Knowledge Graph Embedding for Link Prediction: A Comparative Analysis," arXiv, Feb. 3, 2020, arXiv:2002.00819v1, 42 pages.

Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.

Schatz et al., "Economic valuation for information security investment: a systematic literature review," Information Systems Frontiers, Apr. 18, 2016, 19:1205-1228.

Shandilya et al., "Use of Attack Graphs in Security Systems", Hindawi Journal of Computer Networks and Communications, Oct. 20, 2014, 2014:818957, 14 pages.

Shi et al., "Normalized Cuts and Image Segmentation," IEEE Transactions on Pattern Analysis and Machine Intelligence, Aug. 2000, 22(8):888-905.

Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.

Sitton-Candanedo et al., "A review of edge computing reference architectures and a new global edge proposal," Future Generation Computer Systems, Oct. 2019, 99:278-294.

SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.

Sourceforge.net [online], "XSB," last updated Oct. 29, 2017, retrieved on Jun. 3, 2020, retrieved from URL <http://xsb.sourceforge.net/>, 2 pages.

Stanek et al., "Method of comparing graph differencing algorithms for software differencing," 2008 IEEE International Conference on Electro/Information Technology, Ames, Iowa, May 18-20, 2008, 482-487.

Strom et al., "MITRE ATT&CK™: Design and Philosophy", The MITRE Corporation, Jul. 2018, 37 pages.

Swiler et al., "A graph-based network-vulnerability analysis system," Sandia National Laboratories, 1997, Tech. Rep. SAND97-3010/1, 25 pages.

Tan et al., "Future internet: The Internet of Things," Presented at Proceedings of the 2010 3rd International Conference on Advanced Computer Theory and Engineering (ICACTE), Chengdu, China, Aug. 20-22, 2010,.

TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.

The Fourth Industrial Revolution, 1st. ed., Schwab, Jan. 2017, 218 pages.

The MITRE Corporation [online], "MITRE ATT&CK," last updated May 27, 2020, retrieved on Jun. 3, 2020, retrieved from URL <https://attack.mitre.org/>, 3 pages.

Ullah et al., "Towards Modeling Attacker's Opportunity for Improving Cyber Resilience in Energy Delivery Systems", Resilience Week, Aug. 2018, pp. 100-107.

Uschold et al., "Ontologies: Principles, methods and applications," The Knowledge Engineering Review, Jan. 1996, 11(2):93-136.

Van Der Aalst et al., "Causal Nets: A Modeling Language Tailored towards Process Discovery," Presented at Proceedings of Concur 2011—Concurrency Theory, Aachen, Germany, Sep. 6-9, 2011; Lecture Notes in Computer Science, Sep. 2011, 6901:28-42.

Van Heijst et al., "Using explicit ontologies in KBS development," International Journal of Human-Computer Studies, Feb. 1997, 46(2-3):183-292.

Vehicle Power Management, 1st ed., Zhang et al.(eds.), Aug. 2011, Chapter 10, 27 pages.

w3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.

Wand et al., "On the deep structure of information systems," Information Systems Journal, Jul. 1995, 5(3):203-223.

Wang et al., "A Network Vulnerability Assessment Method Based on Attack Graph," 2018 IEEE 4th International Conference on Computer and Communications, Dec. 7-10, 2018, Chengdu, China, 1149-1154.

(56) References Cited

OTHER PUBLICATIONS

Wang et al., "Big data analytics in cyber security: network traffic and attacks," Journal of Computer Information Systems, Jan. 2020, 61(3):1-8.

Wang et al., "Exploring Attack Graph for Cost-benefit Security Hardening: A Probabilistic Approach," Computers & Security, Feb. 2013, 32:158-169.

Ward et al., "Threat Analysis and Risk Assessment in Automotive Cyber Security," SAE Int. J. Passeng. Cars Electron. Electr. Systems, May 2013, 6(2):507-513.

Wikipedia.org [online], "5G," last updated Jul. 9, 2021, retrieved on Jul. 9, 2021, retrieved from URL<https://en.wikipedia.org/wiki/5G>, 29 pages.

Wikipedia.org [online], "Active Directory," last updated Jun. 1, 2020, retrieved on Jun. 3, 2020, retrieved from URL <https://en.wikipedia.org/wiki/Active_Directory>, 14 pages.

Wikipedia.org [online], "Backward Chaining," last updated Nov. 16, 2019, retrieved on Jun. 3, 2020, retrieved from URL <https://en.wikipedia.org/wiki/Backward_chaining>, 3 pages.

Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.

Wikipedia.org [online], "Cartesian Product," last updated Feb. 28, 2020, retrieved on Jun. 3, 2020, retrieved from URL <https://en.wikipedia.org/wiki/Cartesian_product>, 9 pages.

Wikipedia.org [online], "Centrality," last updated May 29, 2020, retrieved on Jun. 3, 2020, retrieved from URL <https://en.wikipedia.org/wiki/Centrality>, 15 pages.

Wikipedia.org [online], "Centrality," last updated Oct. 18, 2020, retrieved on Oct. 26, 2020, retrieved from URL<https://en.wikipedia.org/wiki/Centrality>, 15 pages.

Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.

Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.

Wikipedia.org [online], "Depth-first search," last updated Jun. 16, 2021, retrieved on Jul. 28, 2021, retrieved from URL<https://en.wikipedia.org/wiki/Depth-first_search>, 8 pages.

Wikipedia.org [online], "Digital twin," last updated Jul. 8, 2021, retrieved on Jul. 9, 2021, retrieved from URL<https://en.wikipedia.org/wiki/Digital_twin>, 13 pages.

Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.

Wikipedia.org [online], "Flood Fill," last updated Dec. 24, 2019, retrieved on Jun. 3, 2020, retrieved from URL <https://en.wikipedia.org/wiki/Flood_fill>, 7 pages.

Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.

Wikipedia.org [online], "Forward Chaining," last updated Nov. 18, 2019, retrieved on Jun. 3, 2020, retrieved from URL <https://en.wikipedia.org/wiki/Forward_chaining>, 3 pages.

Wikipedia.org [online], "Look-ahead (backtracking)," last updated May 23, 2020, retrieved on Jun. 3, 2020, retrieved from URL <https://en.wikipedia.org/wiki/Look-ahead (backtracking)>, 3 pages.

Wikipedia.org [online], "Natural language processing," last updated Jun. 10, 2022, retrieved on Jun. 14, 2022, retrieved from URL<https://en.wikipedia.org/wiki/Natural_language_processing>, 13 pages.

Wikipedia.org [online], "Reachability," last updated Oct. 22, 2021, retrieved on Jul. 13, 2022, retrieved from URL<https://en.wikipedia.org/wiki/Reachability>, 5 pages.

Wikipedia.org [online], "SCADA," last updated Jun. 2, 2020, retrieved on Jun. 3, 2020, retrieved from URL <https://en.wikipedia.org/wiki/SCADA>, 12 pages.

Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.

Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.

Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.

Wikipedia.org [online], "Traffic flow," last updated Oct. 19, 2020, retrieved on Oct. 26, 2020, retrieved from URL<https://en.wikipedia.org/wiki/Traffic_flow>, 41 pages.

Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.

Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.

X. Li, C. Zhang, T. Jung, J. Qian and L. Chen, "Graph-based privacy-preserving data publication," IEEE Infocom 2016—The 35th Annual IEEE International Conference on Computer Communications, 2016, pp. 1-9, doi: 10.1109/INF000M.2016.7524584. (Year: 2016).

Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.

Yi et al., "Overview on attack graph generation and visualization technology," 2013 International Conference on Anti-Counterfeiting, Security and Identification (ASID), Shanghai, China, Oct. 25-27, 2013, 6 pages.

You et al., "A Review of Cyber Security Controls from an ICS Perspective," Proceedings of 2018 International Conference on Platform Technology and Service (PlatCon), Jan. 29-31, 2018, Jeju, South Korea, 5 pages.

Zeng et al., "Survey of Attack Graph Analysis Methods from the Perspective of Data and Knowledge Processing," Hindawi Security and Communication Networks, Dec. 26, 2019, 2019:2031063, 17 pages.

Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.

Zhang et al., "Optimal Decision-Making Approach for Cyber Security Defense Using Game Theory and Intelligent Learning," Security and Communication Networks, Dec. 23, 2019, 2019:3038586, 17 pages.

Zhao et al., "Attack graph analysis method for large scale network security hardening," J. Front. Comput. Sci. Technology, 2018, 12(2):263-273 (with English Abstract).

AUTOMATED PREDICTION OF CYBER-SECURITY ATTACK TECHNIQUES USING KNOWLEDGE MESH

CROSS-REFERENCE TO RELATED APPLICATIONS

This application claims priority to U.S. 63/352,471 filed on Jun. 15, 2022, and U.S. 63/410,698, filed on Sep. 28, 2022, the disclosures of which are expressly incorporated herein by reference in the entirety.

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

Modern computer networks are largely segregated and often deployed with diverse cyber defense mechanisms, which makes it challenging for an attacker (hacker) to gain direct access to a target (e.g., administrator credentials). This pattern is commonly seen in industrial control systems (ICSs) where a layered architecture ensures that targets are not in close proximity to the perimeter. Despite the presence of a layered architecture, the spate of attacks is increasing rapidly and span from large enterprises to critical infrastructure (CINF) networks. Due to the potential severe damage and cost experienced by a victim, CINFs have been intentionally targeted and have suffered from significant losses when successfully exploited.

Due to the decentralized nature of common vulnerability enumeration (CVE) reporting and generation, there are often incomplete, incorrect, or overly broad fields in the descriptive fields for the CVE. These misaligned fields can affect the quickness and quality of responses to newly released or detected vulnerabilities, in the case of incomplete or incorrect fields, breaking automation processes built around them, and in the case of incorrect or overly broad field, affecting the quality of response and remediation to the CVE.

Organization can use security sensors to identify, understand, and triage security issues in the emerging threat landscape. Such security tools providing identifiers of issues detected, normally in form of CVE and/or common weakness enumeration (CWE). In some examples, dedicated advisories issued by the security sensors can be used to provide deeper analysis in freeform text. The fusion of information can be used to provide a holistic view of the organizations by aggregating various sensors. Security issues can be classified by unified taxonomy or frameworks.

SUMMARY

Implementations of the present disclosure are directed to a security mesh enhanced sagacity hub (SMESH) for enterprise-wide cyber-security. More particularly, implementations of the present disclosure are directed to using a SMESH to provide one or more knowledge meshes, each knowledge mesh including two or more knowledge graphs that are integrated together, each knowledge graph being associated with a respective aspect of cyber-security. In some examples, the SMESH includes a set of modules, each module associated with a respective aspect and providing a knowledge graph specific to the respective aspect.

An objective of the disclosed techniques is to improve the automation processes of vulnerability reporting by increasing the quality of enrichment for the vulnerability reporting. The disclosed techniques can be used to predict a CWE based on information fields in the CVE report to obviate problems with the quality of data present in the CWE field. The techniques enable automation of the enrichment of CWE data to vulnerability reports in the case of missing data. This can reduce time and cost to action, as well as improve the quality of labels in the case of overly broad labels, improving the analysis workflow and quality of responses. This provides the ability to automatically complete cyber-security reports for any finding description.

Automatically classifying risk can reduce update time and allow for refreshing many records of security incidents in a reduced amount of time. Such update is relevant especially in security due to the dynamic nature of the domain, frequently encountering new issues, adversarial techniques, and countermeasures. The disclosed techniques can use a hybrid artificial intelligence approach to infer missing links in the SMESH. Missing links can be inferred, for example, using logical inference and machine learning model-based inference. The disclosed systems and techniques can be implemented to classify cyber-security issues, such as those described by a free text, to an adversarial technique.

In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include selecting one or more modules for inclusion in a knowledge mesh, each module is associated with a respective aspect and maintains a knowledge graph specific to the respective aspect, each knowledge graph is generated using data from one or more cyber-security repositories and includes nodes and connections between the nodes; receiving a query corresponding to a node of a knowledge graph of the one or more modules of the knowledge mesh; generating a response to the query by identifying connections between the node of the knowledge graph and at least one node of at least one other knowledge graph of the one or more modules of the knowledge mesh; and identifying, based on the response to the query, one or more actions to reduce cyber-security risk.

Other implementations of this aspect include corresponding systems, apparatus, and computer programs, configured to perform the actions of the methods, encoded on computer storage devices.

In some implementations, actions include providing a SMESH that includes a data federation architecture including a data federation manager and a set of modules, each module associated with a respective aspect and maintaining a knowledge graph specific to the respective aspect, each knowledge graph being generated based on data mined from one or more cyber-security repositories, the data federation manager provisioning one or more knowledge meshes, each knowledge mesh being based on two or more knowledge graphs. Other implementations of this aspect include corresponding systems, apparatus, and computer programs, configured to perform the actions of the methods, encoded on computer storage devices.

In some implementations, actions include selecting one or more modules for inclusion in a knowledge mesh, wherein each module is associated with a respective aspect and maintains a knowledge graph specific to the respective aspect, wherein each knowledge graph is generated using data from one or more cyber-security repositories and includes nodes and connections between the nodes; receiving a query corresponding to a first node of a first knowledge graph included in the knowledge mesh; generating a response to the query by identifying connections between the first node of the first knowledge graph and at least one node of at least one other knowledge graph included in the knowledge mesh; and identifying, based on the response to the query, one or more actions to reduce cyber-security risk.

Other implementations of this aspect include corresponding systems, apparatus, and computer programs, configured to perform the actions of the methods, encoded on computer storage devices.

These and other implementations can optionally include one or more of the following features: the first knowledge graph is maintained by a first module, and generating a response to the query by identifying connections between the first node of the first knowledge graph and at least one node of at least one other knowledge graph included in the knowledge mesh comprises: identifying a connection between the first node of the first knowledge graph maintained by the first module and a second node of a second knowledge graph maintained by a second module; the first knowledge graph is maintained by a first module, and generating a response to the query by identifying connections between the first node of the first knowledge graph and at least one node of at least one other knowledge graph included in the knowledge mesh comprises: identifying matching entities between the first knowledge graph maintained by the first module and a second knowledge graph maintained by a second module; the actions include performing the one or more actions to reduce cyber-security risk; the actions include extracting, from the knowledge mesh, data indicating vulnerabilities and associated weaknesses; and training, using the extracted data, a plurality of machine learning models to predict weaknesses from input vulnerabilities; the actions include providing, as input to the plurality of machine learning models, a vulnerability; and receiving, as output from each of the plurality of machine learning models, a predicted weakness corresponding to the vulnerability; the actions include determining, based on the output from each of the plurality of machine learning models, that a particular predicted weakness is output from a greater number of machine learning models than any other predicted weakness; and in response, selecting the particular predicted weakness as corresponding to the vulnerability; the data indicating vulnerabilities includes, for each vulnerability, a textual description and a severity score; receiving a query corresponding to the first node of the first knowledge graph included in the knowledge mesh comprises: receiving, as input, at least one of a weakness identifier, a vulnerability identifier, or a textual description of a vulnerability; generating a response to the query by identifying connections between the first node of the first knowledge graph and at least one node of at least one other knowledge graph included in the knowledge mesh comprises: using the at least one of the weakness identifier, vulnerability identifier, or textual description of the vulnerability, determining an attack technique; an aspect of a module includes vulnerabilities, weaknesses, attack patterns, adversary tactics, countermeasure, cloud resources, or threat intelligence; the first node of the knowledge graph represents one of a weakness or a vulnerability; the at least one node of the at least one other knowledge graph included in the knowledge mesh represents one of: a weakness, a vulnerability, an attack technique, an attack tactic, an attack pattern, a threat, a defensive technique, a defensive tactic, a digital artifact, a digital object, a digital event.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
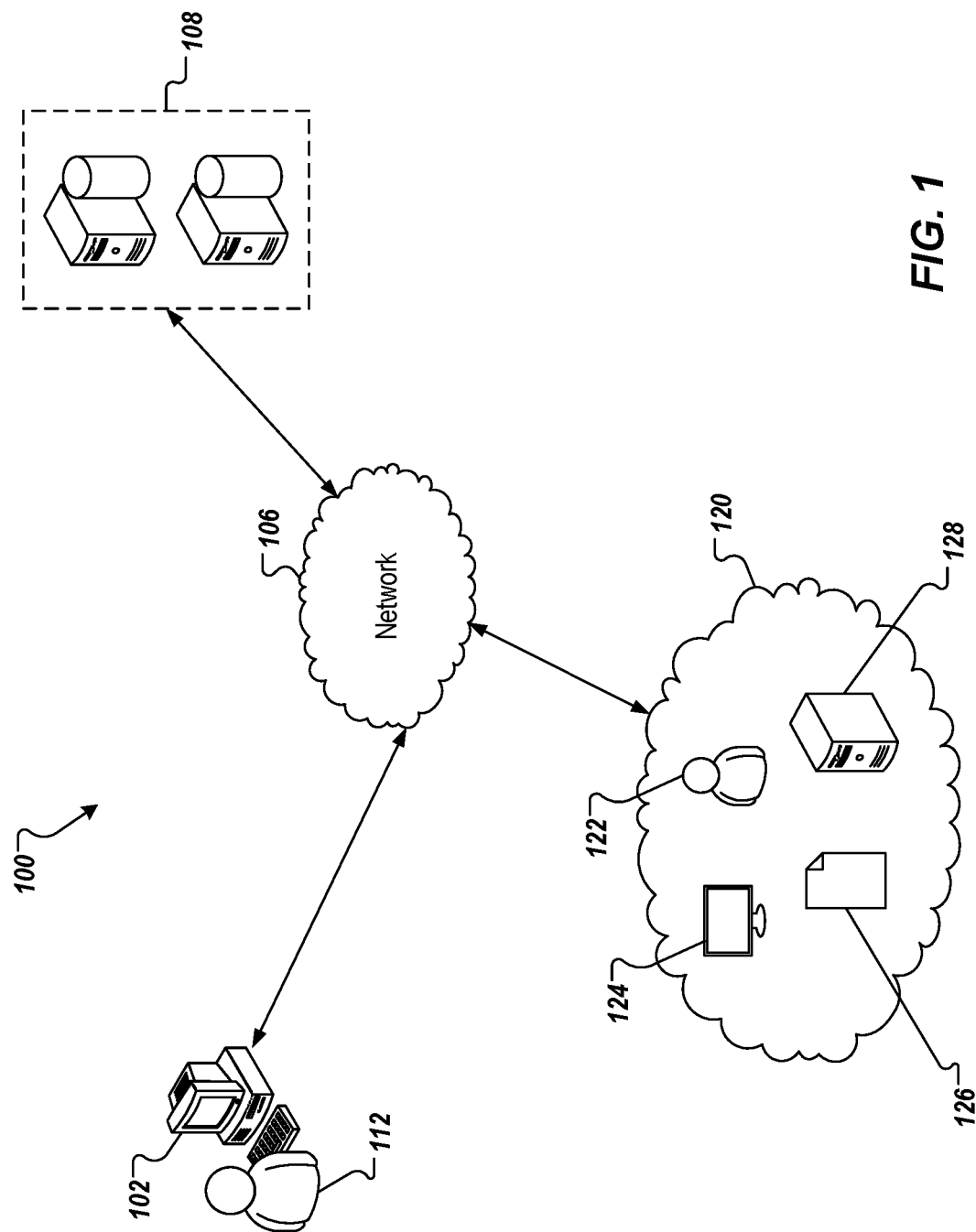
FIG. 1 depicts an example architecture that can be used to execute implementations of the present disclosure.

Implementations of the present disclosure are directed to a security mesh enhanced sagacity hub (SMESH) for enterprise-wide cyber-security. More particularly, implementations of the present disclosure are directed to using a SMESH to provide one or more knowledge meshes, each knowledge mesh including two or more knowledge graphs that are integrated together, each knowledge graph being associated with a respective aspect of cyber-security. In some examples, the SMESH includes a set of modules, each module associated with a respective aspect and providing a knowledge graph specific to the respective aspect. In some examples, the set of modules is provided in a data federation architecture that enables extension and segregation of information per need. In some examples, the knowledge graphs, and knowledge mesh(es), are ontology-driven to enable evolution through multiple contributors and stakeholders and is built on data mined from multiple cyber-security repositories (data sources) (e.g., threat intelligence, cloud vendors). Further, implementations of the present disclosure provide for extended information completion and supports coverage increase over all references in the knowledge graphs including adding missing objects.

In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

To provide context for implementations of the present disclosure, and as introduced above, modern computer networks are largely segregated and often deployed with diverse cyber defense mechanisms, which makes it challenging for an attacker (hacker) to gain direct access to a target (e.g., administrator credentials). This pattern is commonly seen in industrial control system (ICSs) where a layered architecture ensures that targets are not in close proximity to the perimeter. Despite the presence of a layered architecture, the spate of attacks is increasing rapidly and span from large enterprises to the critical infrastructure (CINF) networks. Due to the potential severe damage and cost experienced by a victim nation, CINF networks have been intentionally targeted intentionally and have suffered from significant losses when successfully exploited.

In general, attacks on CINF networks occur in multiple stages. Consequently, detecting a single intrusion does not necessarily indicate the end of the attack as the attack could have progressed far deeper into the network. Accordingly, individual attack footprints are insignificant in an isolated manner, because each is usually part of a more complex multi-step attack. That is, it takes a sequence of steps to form an attack path toward a target in the network. Researchers have investigated several attack path analysis methods for identifying attacker's required effort (e.g., number of paths to a target and the cost and time required to compromise each path) to diligently estimate risk levels. However, traditional techniques fail to consider important features and provide incomplete solutions for addressing real attack scenarios. For example, some traditional techniques only consider topological connections to measure the difficulty of reaching a target. As another example, some traditional techniques only assume some predefined attacker skill set to estimate the path complexity. In reality, an attacker's capabilities and knowledge of the enterprise network evolve along attack paths to the target.

Cyber-security repositories have been developed over the years, which serve as central knowledge bases for cyber-security experts to discover information about vulnerabilities, their potential exploitations, and countermeasures. Example repositories include as MITRE provided by The MITRE Corporation (www.mitre.org), the National Vulnerability Database (NVD) provided by the National Institute of Standards and Technology of the U.S. Department of Commerce (nvd.nist.gov), and those provided by the Open Web Application Security Project (OWASP) (owasp.org). Such a knowledge can be leveraged for a cyber-security recommender system (e.g., example functionality of the agile security platform discussed herein) that will accelerate the expert search and provide deep insights that are not explicitly available in these repositories individually, and particularly, collectively.

In view of the above context, implementations of the present disclosure are directed to a SMESH that is generated by mining multiple cyber-security repositories and constructing the SMESH to include a knowledge mesh that represents insights determined from the cyber-security repositories, collectively. More particularly, and as described in further detail herein, implementations of the present disclosure include mining multiple cyber-security repositories and constructing a knowledge mesh having an underlying data federation architecture. Implementations of the present disclosure further provide a set of methods that enable self-evolvement of the knowledge mesh. The resulting knowledge mesh enables advanced capabilities towards cyber-security. For example, the knowledge mesh can be used to enrich security findings reports with potential attack scenarios and other exploitation information, and recommend the most effective countermeasures to avoid a detected vulnerability, among many other use cases. Implementations of the present disclosure address challenges in collating information from the multiple cyber-security repositories. For example, implementations of the present disclosure address representation of multiple cyber-security information sources in a manner that will keep each repository independent, while enabling the usage of semantics across the multiple repositories. As another example, implementations of the present disclosure address performance of information completion over the knowledge mesh. As another example, implementations of the present disclosure address use of the knowledge mesh in a cyber-security recommender system (e.g., functionality provided by the agile security platform) for multiple tasks (e.g., exploitation analysis, countermeasure recommendation.

As described herein, an agile security platform enables continuous cyber operations and enterprise operations alignment controlled by risk management. The agile security platform improves decision-making by helping enterprises to prioritize security actions that are most critical to their operations. In some examples, the agile security platform combines methodologies from agile software development lifecycle, IT management, development operations (DevOps), and analytics that use artificial intelligence (AI). In some examples, agile security automation bots continuously analyze attack probability, predict impact, and recommend prioritized actions for cyber risk reduction. In this manner, the agile security platform enables enterprises to increase operational efficiency and availability, maximize existing cyber-security resources, reduce additional cyber-security costs, and grow organizational cyber resilience.

As described in further detail herein, the agile security platform provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities and improper configurations of each CI are determined and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

In accordance with implementations of the present disclosure, the agile security platform can generate a knowledge mesh by mining information from multiple cyber-security repositories, and use the knowledge mesh for cyber-security related tasks, such as exploitation analysis and countermeasure recommendation. While implementations of the present disclosure are described in detail herein with reference to the agile security platform, it is contemplated that implementations of the present disclosure can be realized with any appropriate cyber-security platform.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

In some implementations, the agile security platform is hosted within the server system 108, and monitors and acts on the enterprise network 120, as described herein. More particularly, and as described in further detail herein, one or more AAGs representative of the enterprise network are generated in accordance with implementations of the present disclosure. For example, the agile security platform detects IT/OT assets and generates an asset inventory and network maps, as well as processing network information to discover vulnerabilities in the enterprise network 120. The agile security platform generates and uses a knowledge mesh in accordance with implementations of the present disclosure.

Figure 2:
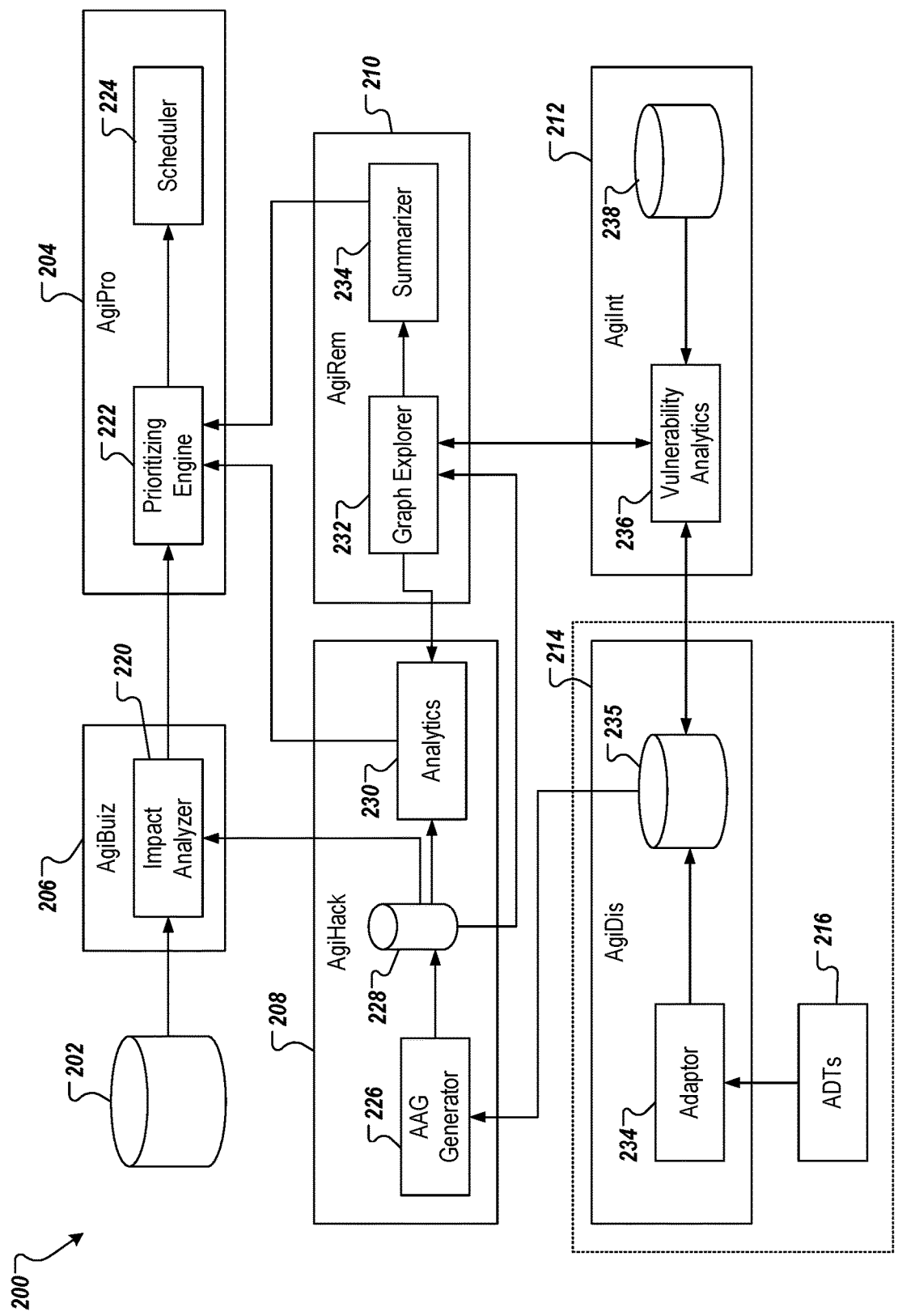
FIG. 2 depicts an example conceptual architecture of an agile security platform.

FIG. 2 depicts an example conceptual architecture 200 of an agile security (AgiSec) platform. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 235. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. In some implementations, the AgiDis service 214 provides both active and passive scanning capabilities to comply with constraints, and identifies device and service vulnerabilities, improper configurations, and aggregate risks through automatic assessment. The discovered assets can be used to generate an asset inventory, and network maps. In general, the AgiDis service 214 can be used to discover assets in the enterprise network, and a holistic view of network and traffic patterns. More particularly, the AgiDis service 214 discovers assets, their connectivity, and their specifications and stores this information in the asset/vulnerabilities knowledge base 235. In some implementations, this is achieved through passive network scanning and device fingerprinting through the adaptor 234 and ADT 216. The AgiDis service 214 provides information about device models.

In the example of FIG. 2, the AgiInt service 212 includes a vulnerability analytics module 236 and a threat intelligence knowledge base 238 (e.g., CVE, CAPEC, CWE, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets. The discovered vulnerabilities are provided back to the AgiDis service 214 and are stored in the asset/vulnerabilities knowledge base 235 with their respective assets.

In the example of FIG. 2, the AgiHack service 208 includes an analytical attack graph (AAG) generator 226, an AAG database 228, and an analytics module 230. In general, the AgiHack service 208 generates AAGs using resource-efficient AAG generation, and evaluates hacking exploitation complexity. In some examples, the AgiHack service 208 understands attack options, leveraging the vulnerabilities to determine how a hacker would move inside the network and identify targets for potential exploitation. The AgiHack service 208 proactively explores adversarial options and creates AAGs representing possible attack paths from the adversary's perspective.

In further detail, the AgiHack service 208 provides rule-based processing of data provided from the AgiDis service 214 to explore all attack paths an adversary can take from any asset to move laterally towards any target (e.g., running critical operations). In some examples, multiple AAGs are provided, each AAG corresponding to a respective target within the enterprise network. Further, the AgiHack service 208 identifies possible impacts on the targets. In some examples, the AAG generator 226 uses data from the asset/vulnerabilities knowledge base 236 of the AgiDis service 214, and generates an AAG. In some examples, the AAG graphically depicts, for a respective target, all possible impacts that may be caused by a vulnerability or network/system configuration, as well as all attack paths from anywhere in the network to the respective target. In some examples, the analytics module 230 processes an AAG to identify and extract information regarding critical nodes, paths for every source-destination pair (e.g., shortest, hardest, stealthiest), most critical paths, and critical vulnerabilities, among other features of the AAG. If remediations are applied within the enterprise network, the AgiHack service 208 updates the AAG.

In the example of FIG. 2, the AgiRem service 210 includes a graph explorer 232 and a summarizer 234. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remedial actions by exploring attack graph and paths. For example, the AgiRem service 210 can execute a cyber-threat analysis framework that characterizes adversarial behavior in a multi-stage cyber-attack process, as described in further detail herein.

In further detail, for a given AAG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 234 is provided as a natural language processing (NLP) tool that extracts concise and salient text from large/unstructured threat intelligence feeds. In this manner, the AgiSec platform can convey information to enable users (e.g., security teams) to understand immediate remedial actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber-attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AAG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remedial actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remedial actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

Figure 3:
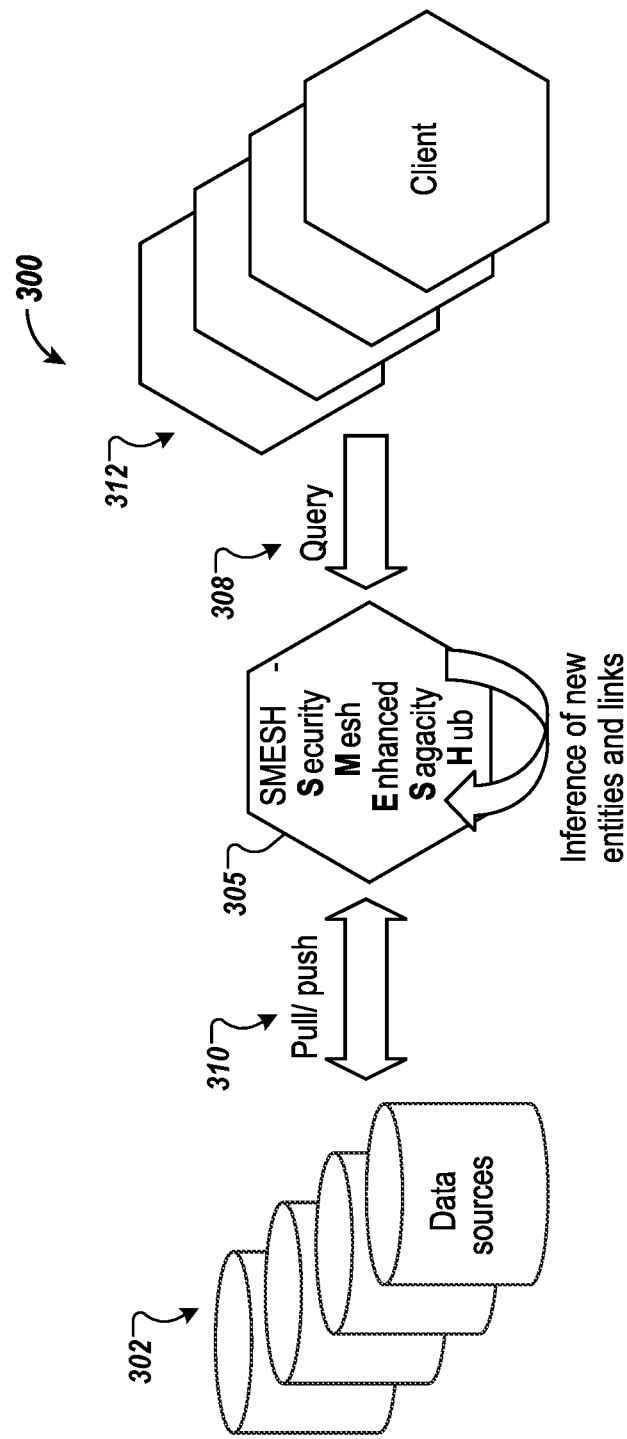
FIG. 3 depicts a high-level architecture using a knowledge mesh provided in accordance with implementations of the present disclosure.

FIG. 3 depicts a high-level architecture 300 using a knowledge mesh provided in accordance with implementations of the present disclosure. In some implementations, a SMESH 305 gathers information from multiple cyber-security data sources 302, and applies a continuous inference process to infer entities and links from the information. The SMESH 305 can pull and push 310 data from the data sources 302. The SMESH 305 provides a knowledge mesh, as described herein, which can be queried by clients 312. Multiple different types of clients can submit queries 308, such as cloud security advisor or a red team.

Figure 4:
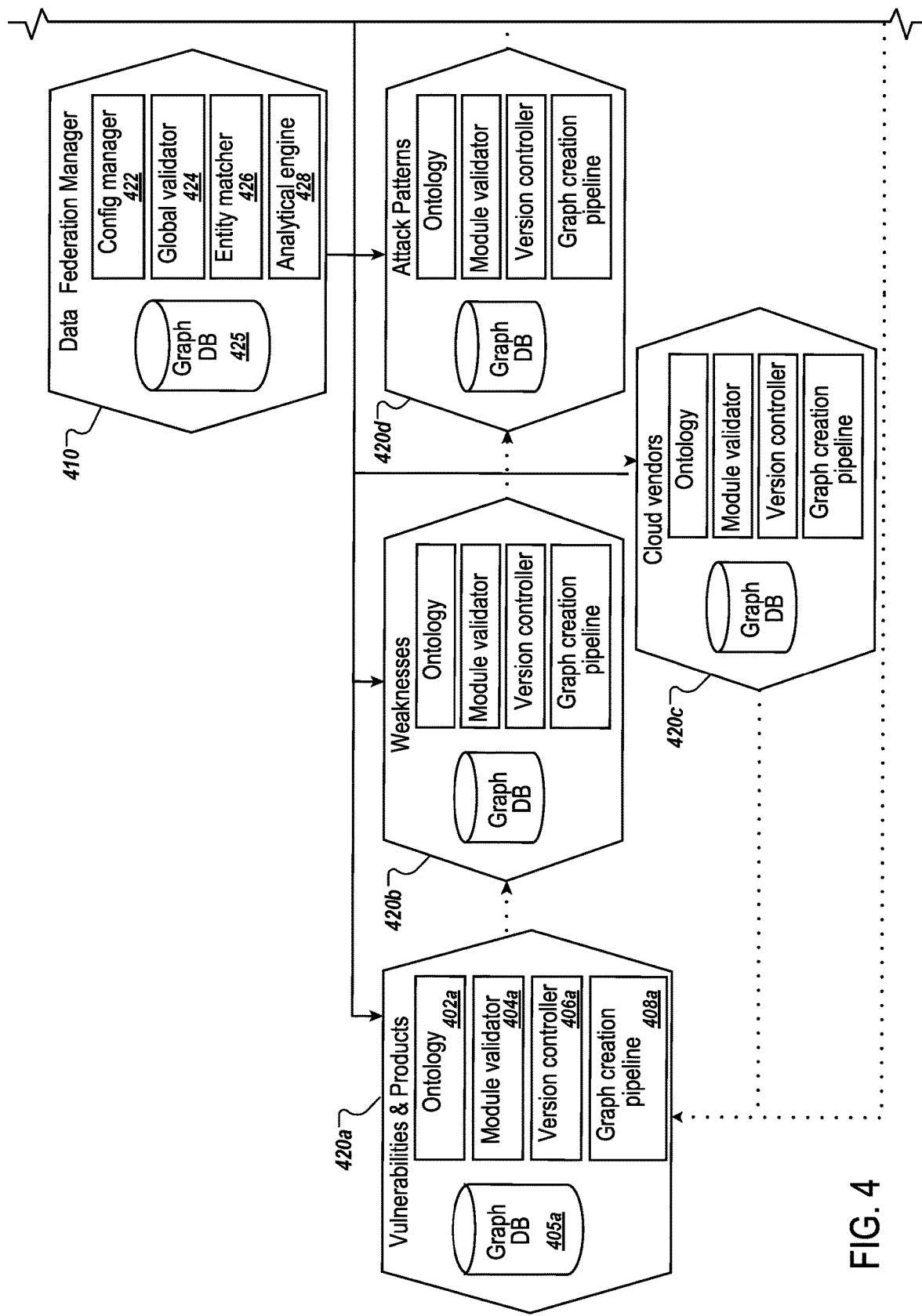
FIG. 4 depicts an example representation of a data federation architecture in accordance with implementations of the present disclosure.
Figure 4:
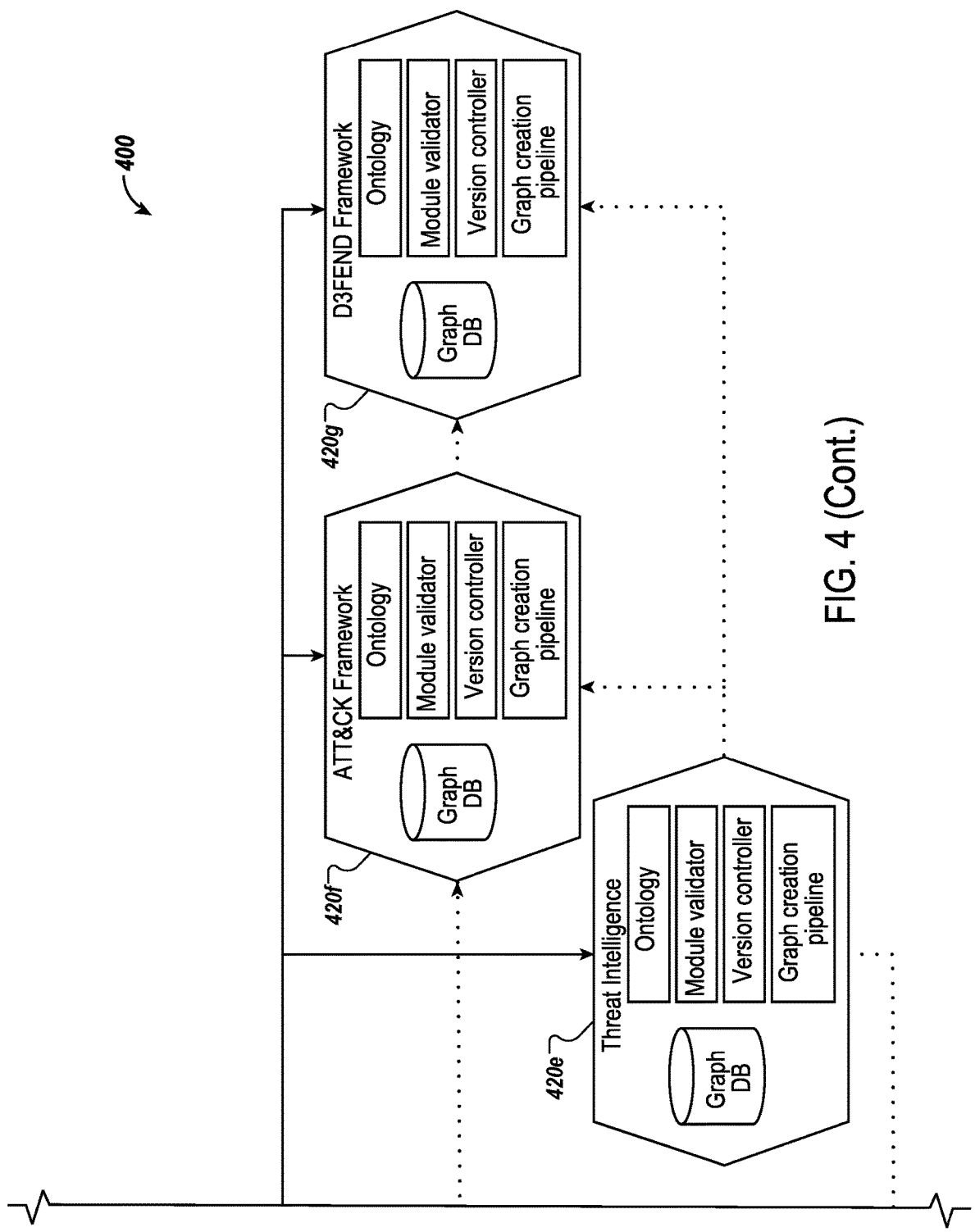

FIG. 4 depicts an example representation of a data federation architecture 400 in accordance with implementations of the present disclosure. The SMESH 305 maintains a data federation architecture 410. In the example of FIG. 4, the SMESH 305 is includes the data federation manager 410 and a set of knowledge graph modules 420a to 420g (modules 420).

In some examples, the data federation 410 selects the knowledge graph modules 420a to 420g for inclusion in the knowledge mesh from a larger set of modules. In some examples, in the set of modules 420 can be added, aggregated, and/or segregated. Each module in the set of modules 420 is registered with the data federation manager 410 and corresponds to a respective aspect. Each module maintains a knowledge graph specific to the respective aspect. Example aspects include, for example, vulnerabilities and products (module 420a), weaknesses (module 420b), cloud vendors (420c), attack patterns (420d), threat intelligence (420e), ATT&CK framework (420f), and D3FEND framework (420g).

In some implementations, the data federation 410 manager is in charge of global management of the set of modules 420. In the example of FIG. 4, the data federation manager 420 includes a graph database 425, a configuration manager 422, a global validator 424, an entity matcher 426, and an analytical engine 428. In some examples, the configuration manager 4422 is a component that configures which modules 420 are part of the federation, and where each graph database is located. In some examples, the entity matcher 426 is a component that specifies concepts matching across all modules (for example, all entities with label $X_1$ in database $Y_1$ are identical to entities with label $X_2$ in database $Y_2$ according to a function $f(x_1 \rightarrow x_2)$). In some examples, the analytical engine 428 is a component that realizes advanced analytics on top of the data federation. Example analytics can include data federation graph queries (queries that traverse the knowledge graphs across the shards), cross-shards graph algorithms, graph theory algorithms (e.g., shortest path, centrality measures), information completion of missing entities and relations, and entity similarity. In some examples, the global validator 424 is a component that verifies that all graph databases hold the required entities and relations to run a valid execution of analytics.

In general, each module 420 in the set of modules is independent, and includes a graph database, an ontology, a validator, a version controller, and a graph creation pipeline. For example, the module 420a includes graph database 405a, ontology 402a, module validator 404a, version controller 406a, graph creation pipeline 408a. In some examples, the graph database (e.g., graph database 405a) is a dedicated graph database holds a knowledge graph provided for the respective module 420. In some examples, the ontology (e.g., 402a) is provided as a web ontology language (OWL) model of the knowledge graph. In some examples, the validator (e.g., validator 404a) is a component that validates the knowledge graph with regard to the ontology. In some examples, the version controller (e.g., version controller 406a) is a component that manages versions of the knowledge graph. In some examples, the graph creation pipeline (e.g., graph creation pipeline 408a) is a pipeline that transforms the source data (e.g., information from repositories) into a valid knowledge graph for the respective module 420. In this way, the knowledge graph for a module is generated using data from one or more cyber-security repositories. Table 1, below, provides an example mapping of each module to a respective cyber-security repository (data source).

TABLE 1

Example Mapping of Modules to Data Sources

| KG module | Description | Data source |
| --- | --- | --- |
| Vulnerabilities[1] and products[2] (420a) | *CVE: This repository enumerates the known security vulnerabilities by CVE (Common Vulnerabilities and Exposures) id and entry. For each CVE the entry contains the following data: textual description, severity score (CVSS), references and CPE (NVD) and CWE (MITRE) relations.<br>*CPE: Except of the vulnerabilities, NVD also holds CPE (Common Platform Enumeration) which is a structured naming scheme that standard the platform (vendor, name, version, etc.) to one format. CPE also includes a method for checking names against a system, and a description format for binding text and tests to a name.<br>*CVE represents a specific vulnerability in a specific platform(s). There is a relation between CVE to each relevant CPE, but not all the relations exist. | NVD: National Vulnerability Database (NVD) |
| Weaknesses[3] (420b) | CWE: Common Weakness Enumeration is a list of software and hardware weakness types. CWE assign relations between the different existing CWE entries, for example 'parentOf', 'peerOf', | MITRE |

TABLE 1-continued

Example Mapping of Modules to Data Sources

| KG module | Description | Data source |
|---|---|---|
| | etc. In addition, each CWE entry contains its own textual description, CWE group membership, examples of related CVEs, and related attack pattern, CAPEC. | |
| Attack patterns[4] (420d) | CAPEC: provides a comprehensive dictionary of known patterns of attack employed by adversaries to exploit known weaknesses in cyber-enabled capabilities. | |
| ATT&CK[5] framework (420f) | ATT&CK: a globally-accessible knowledge base of adversary tactics and techniques based on real-world observations. The ATT&CK knowledge base is used as a foundation for the development of specific threat models and methodologies in the private sector, in government, and in the cyber-security product and service community. | |
| D3FEND[6] framework (420g) | D3FEND: a knowledge graph of countermeasures which associated with digital artifacts and attack techniques | |
| Cloud vendors (420c) | Information regards cloud resources and services mined from API specifications | OntoDis |
| Threat intelligence (420e) | Information regards exploitations of vulnerabilities associated with attacker groups, campaigns, targeted industries, and more. | IntelGraph |

[1]https://nvd.nist.gov/vuln
[2]https://nvd.nist.gov/products/cpe/search
[3]https://cwe.mitre.org/
[4]https://capec.mitre.org/
[5]https://attack.mitre.org/

Figure 5:
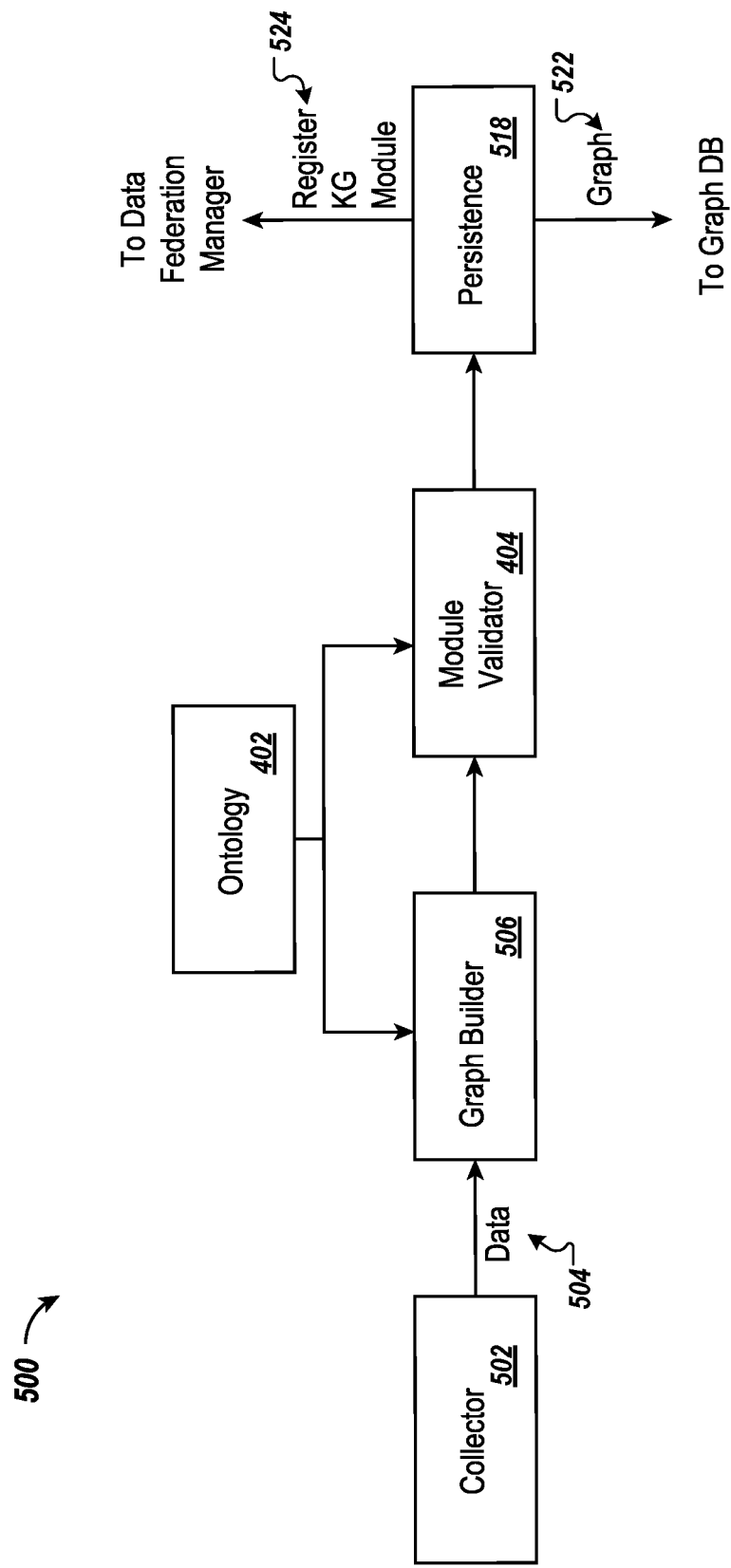
FIG. 5 depicts an example graph creation pipeline in accordance with implementations of the present disclosure.

FIG. 5 depicts an example graph creation pipeline 500 of a knowledge graph module 420 in accordance with implementations of the present disclosure. In the example of FIG. 5, a collector 502 that is specific to a respective module 420 of the data federation architecture 400 collects data 504 from one or more repositories. The data 504 is input to a knowledge graph builder 506. The ontology 402 of the respective module 420 is used to guide the graph build process performed by the graph builder 506, and the validation processes performed by the module validator 404. After persistence processes 518, the so-created knowledge graph 522 is stored in a graph database of the respective module 420. The KG module 420 is registered to the data federation manager 410.

Figure 6:
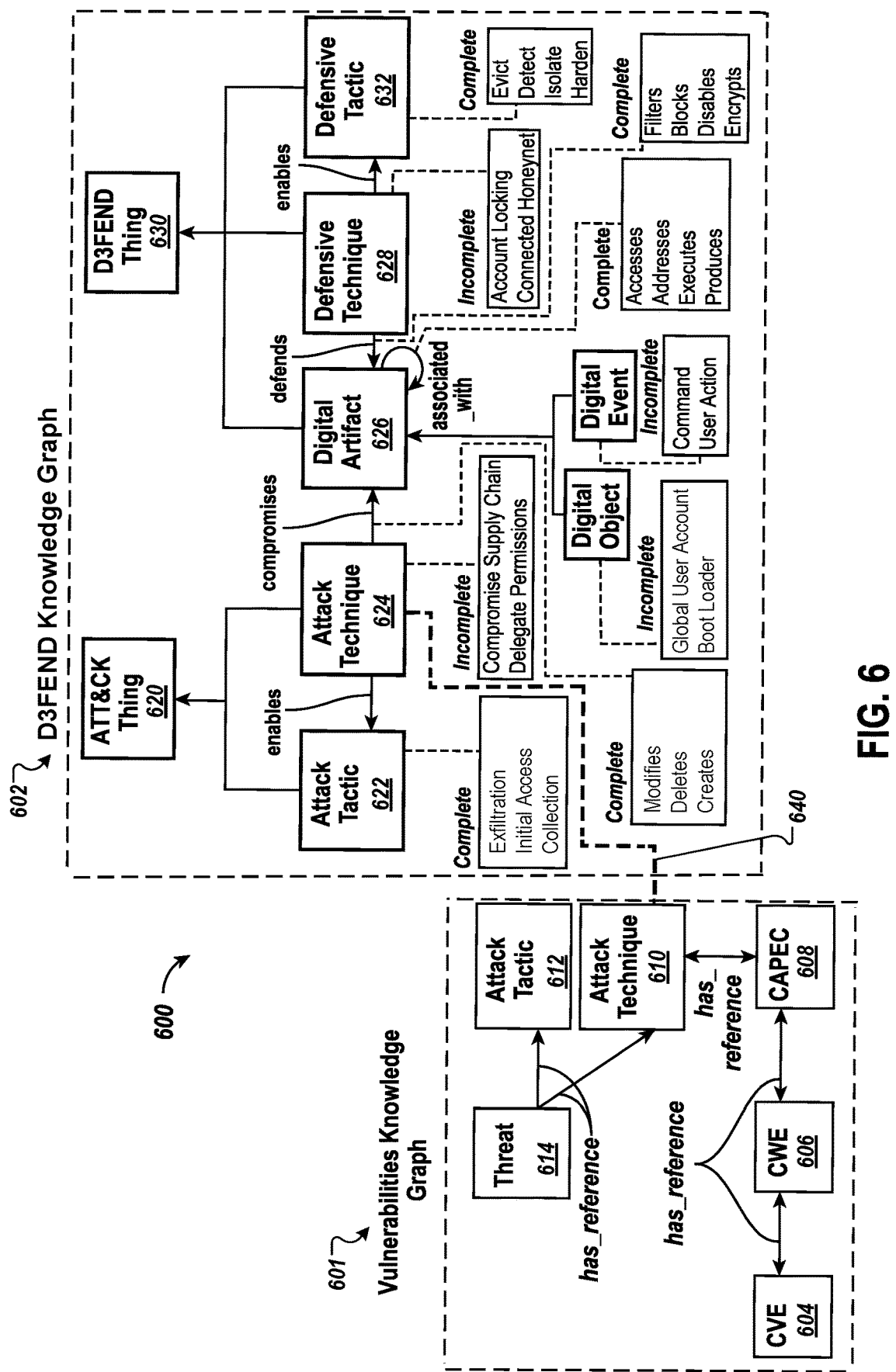
FIG. 6 depicts an example portion of an example knowledge mesh in accordance with implementations of the present disclosure.
Figure 7:
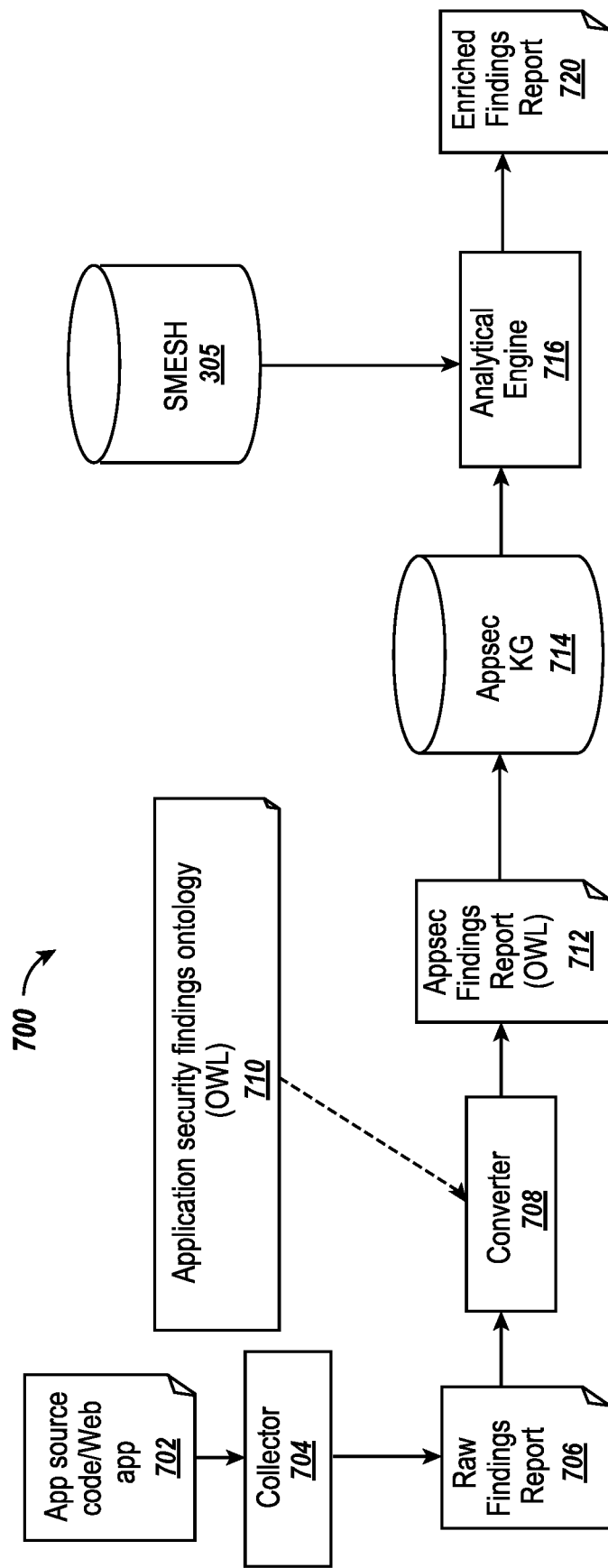
FIGS. 7-10 depict example use cases of knowledge meshes in accordance with implementations of the present disclosure.

In accordance with implementations of the present disclosure, and as described in further detail herein, a knowledge mesh can be described as a mesh of knowledge graphs of two or more of the modules 420 of the data federation architecture 400. For example, FIG. 6 depicts an example portion 600 of an example knowledge mesh. The example portion 600 of the knowledge mesh can be created by, maintained by, and provided by the SMESH 305. In the example of FIG. 6, the example portion 600 of the knowledge mesh includes a mesh of at least a vulnerabilities knowledge graph ("vulnerabilities KG 601") of the vulnerabilities and products module 420a of FIG. 4, and a D3FEND knowledge graph ("D3FEND KG 602") (of the D3FEND framework module 420g of FIG. 4).

The vulnerabilities KG 601 includes nodes and edges, the edges forming connections between nodes and representing relations between nodes. The vulnerabilities KG 601 includes nodes corresponding to a CVE (node 604), a CWE (node 606), a CAPEC (node 608), an attack technique (node 610), an attack tactic (node 612), and a threat (node 614). The D3FEND KG 602 includes nodes and edges between the nodes, the edges representing relations between the nodes. The D3FEND KG 602 includes nodes corresponding to ATT&CK Thing (node 620), D3FEND Thing (node 630), Attack Tactic (node 622), Attack Technique (node 624), Digital Artifact (node 626), Defensive Technique (node 628), and Defensive Tactic (node 632). A relation 640 exists between the Attack Technique 610 of the vulnerabilities KG 601 and the Attack Technique 624 of the D3FEND KG 602. The Attack Technique 610 links the vulnerabilities KG 601 to the D3FEND KG 602 within the portion 600 of the knowledge mesh.

Using a knowledge mesh, such as a knowledge mesh provided by the SMESH 305, multiple use cases can be supported. FIGS. 7-10 depict example use cases of knowledge meshes in accordance with implementations of the present disclosure. The knowledge mesh can be queried to enrich each vulnerability and/or weaknesses with associated attack patterns, offensive techniques, and countermeasures. This is depicted by way of example in FIG. 7, which shows an architecture 700 for enrichment of application security finding reports.

The architecture 700 includes a collector 704, a converter 708, an application security knowledge graph 714, an analytical engine 716, and the SMESH 305. The collector 704 generates a raw findings report 706 from an application source code or web application 702. The converter 708 converts the raw findings report 706 to an application security findings report 712 in OWL format, using an application security findings ontology 710. The application security findings report 712 is stored in an application security knowledge graph database 714. An analytical engine 716 generates an enriched findings report 720 from the application security knowledge graph database 714, using information from the SMESH 305. As described above, the SMESH 305 provides a knowledge mesh including multiple interconnected knowledge graphs.

In some examples, the analytical engine 716 can receive a query and generate an output in response to the query. The query can correspond to a node of a knowledge graph of the knowledge mesh. In some examples, the query includes a weakness identifier, a vulnerability identifier, or a textual description of a vulnerability. The analytical engine 716 can identify connections between the node of the knowledge graph and another node of another knowledge graph included in the knowledge mesh, and generate a response to a query based on the connection between the nodes.

In some examples, identifying connections between nodes of different knowledge graphs can include identifying matching entities between the knowledge graphs. For example, referring back to FIG. 6, an attack technique represented by an attack technique node 610 in the vulnerabilities 601 may match an attack technique represented by an attack technique node 624 in the D3FEND KG 602. Thus, the analytical engine 712 can identify a connection between the attack technique node 610 and the attack technique node 624 in the D3FEND KG 602.

In some examples, based on the response to the query, the analytical engine can identify actions to reduce cybersecurity risk. In some examples, analysis results specifying the identified actions can be provided to a prioritizing engine 222. The prioritizing engine 222 can prioritize identified actions according to their respective risks and predicted impacts. In some examples, the agile security (AgiSec) platform can perform automated actions to mitigate the risks identified by the analytical engine 712 and prioritized by the prioritizing engine 222. Automated actions can include, for example, disabling accounts, disabling or updating workstations, revoking or modifying entitlements of digital identities to applications, updating or patching software, updating applications, fixing compliance issues with workstations, or any combination thereof.

In an example, the analytical engine 716 can receive a query specifying a weakness. The analytical engine 716 can identify a node of a knowledge graph (e.g., a weaknesses knowledge graph maintained by the weaknesses module 420b) corresponding to the specified weakness. The analytical engine 716 can identify connections between the node of the weaknesses knowledge graph and a node or nodes of other knowledge graphs (e.g., an attack pattern knowledge graph maintained by the attack patterns module 420d). The analytical engine 716 can generate, as output, a response to the query specifying a relevant attack pattern based on the connection to the node in the attack pattern knowledge graph.

In another example, the analytical engine 716 can receive a query specifying an attack tactic. The analytical engine 716 can identify a node of a knowledge graph (e.g., an attack tactic knowledge graph maintained by the ATT&CK framework module 420c) corresponding to the specified attack tactic. The analytical engine 716 can identify connections between the node of the attack tactic knowledge graph and a node or nodes of other knowledge graphs (e.g., a vulnerabilities knowledge graph maintained by the vulnerabilities and products module 420a). The analytical engine 716 can generate, as output, a response to the query specifying a relevant vulnerability based on the connection to the node in the vulnerabilities knowledge graph.

Figure 8:
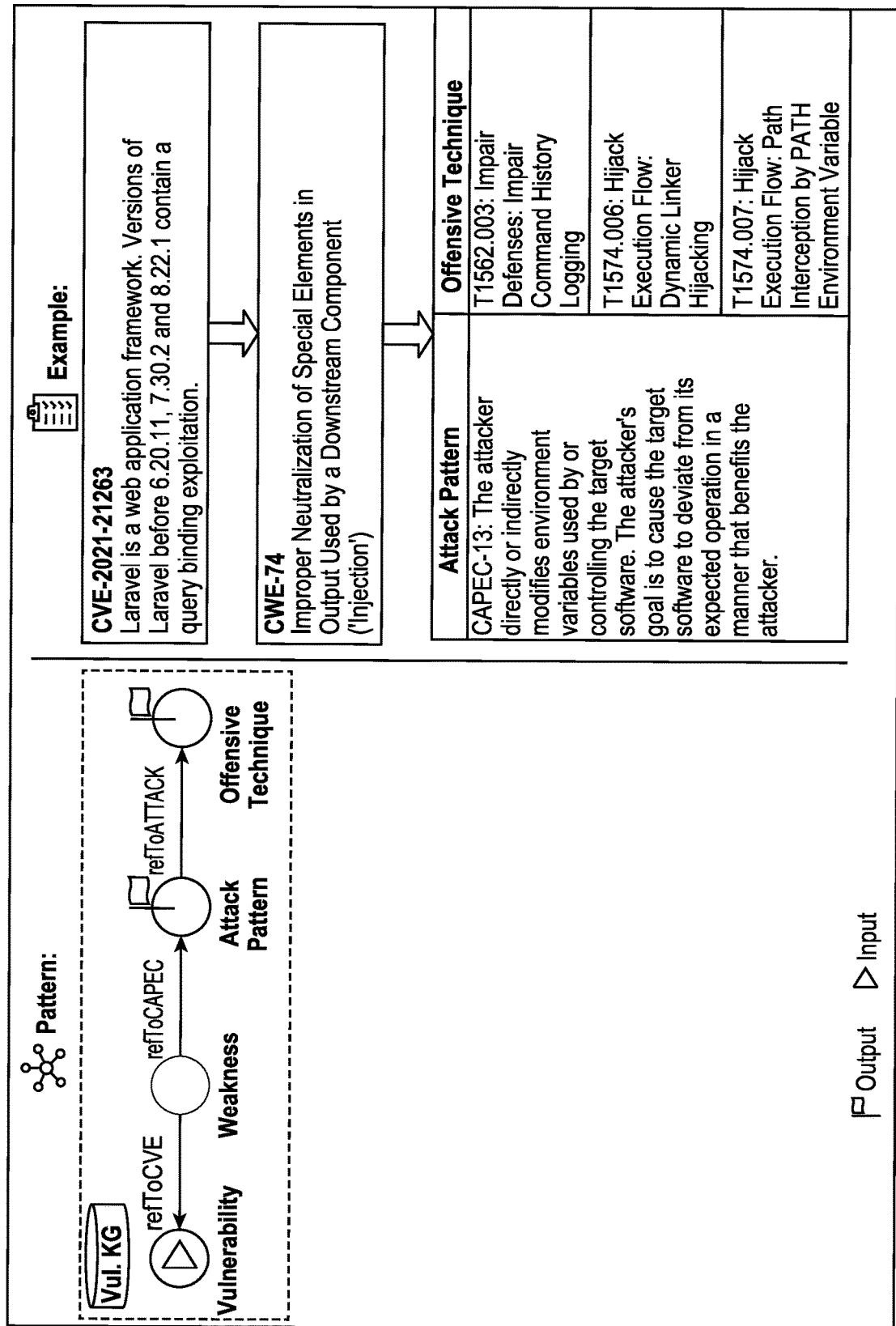

FIG. 8 represents a use case of, given a detected vulnerability or weakness, determining related attack patterns and techniques using a knowledge mesh. In the example of FIG. 8, an application security findings report 712 in the application security knowledge graph database 714 includes CVE-2021-21263, CWE-74, or both. The analytical engine 716 obtains the application security findings report 712 and uses the SMESH 305 to output an enriched findings report 720 including a relevant attack pattern (CAPEC-13) and relevant offensive techniques (T1562.003, T1574.006, T1574.007).

Figure 9:
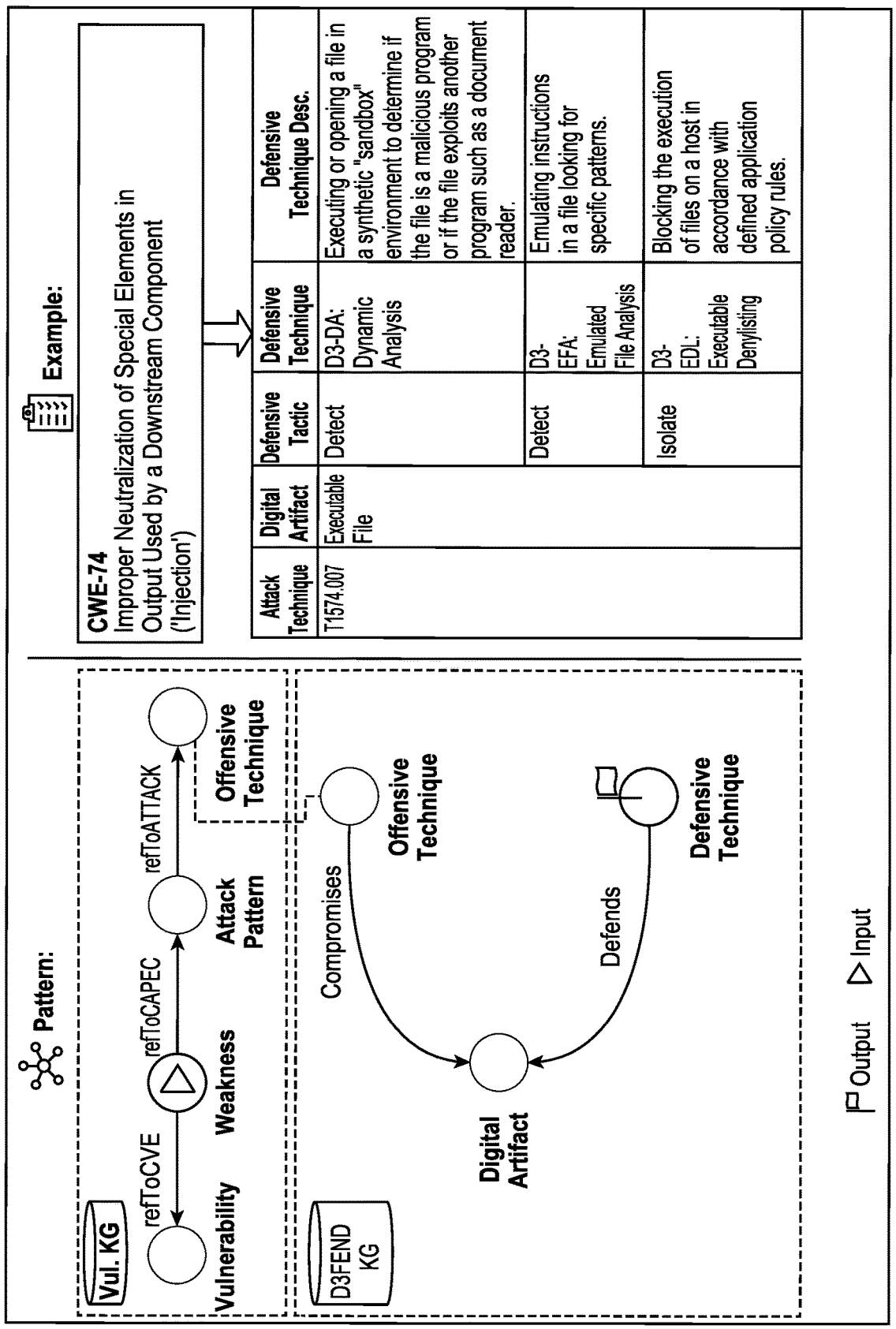

The example of FIG. 9 represents a use case of, given a detected vulnerability/weakness, determining related countermeasures that can be executed to mitigate risk posed by the vulnerability/weakness. In the example of FIG. 9, an application security findings report 712 in the application security knowledge graph database 714 includes CWE-74. The analytical engine 716 obtains the application security findings report 712 and uses the SMESH 305 to output an enriched findings report 720 including a relevant attack technique (T1574.007), digital artifact (executable file), and relevant defensive tactics, defensive techniques, and defensive technique descriptions.

The example analytics of FIGS. 8 and 9, among other analytics, can be used to enrich security finding reports generated by cyber-security scanners (e.g., Veracode, Acunetix), which discover vulnerabilities and/or weaknesses.

Figure 10:
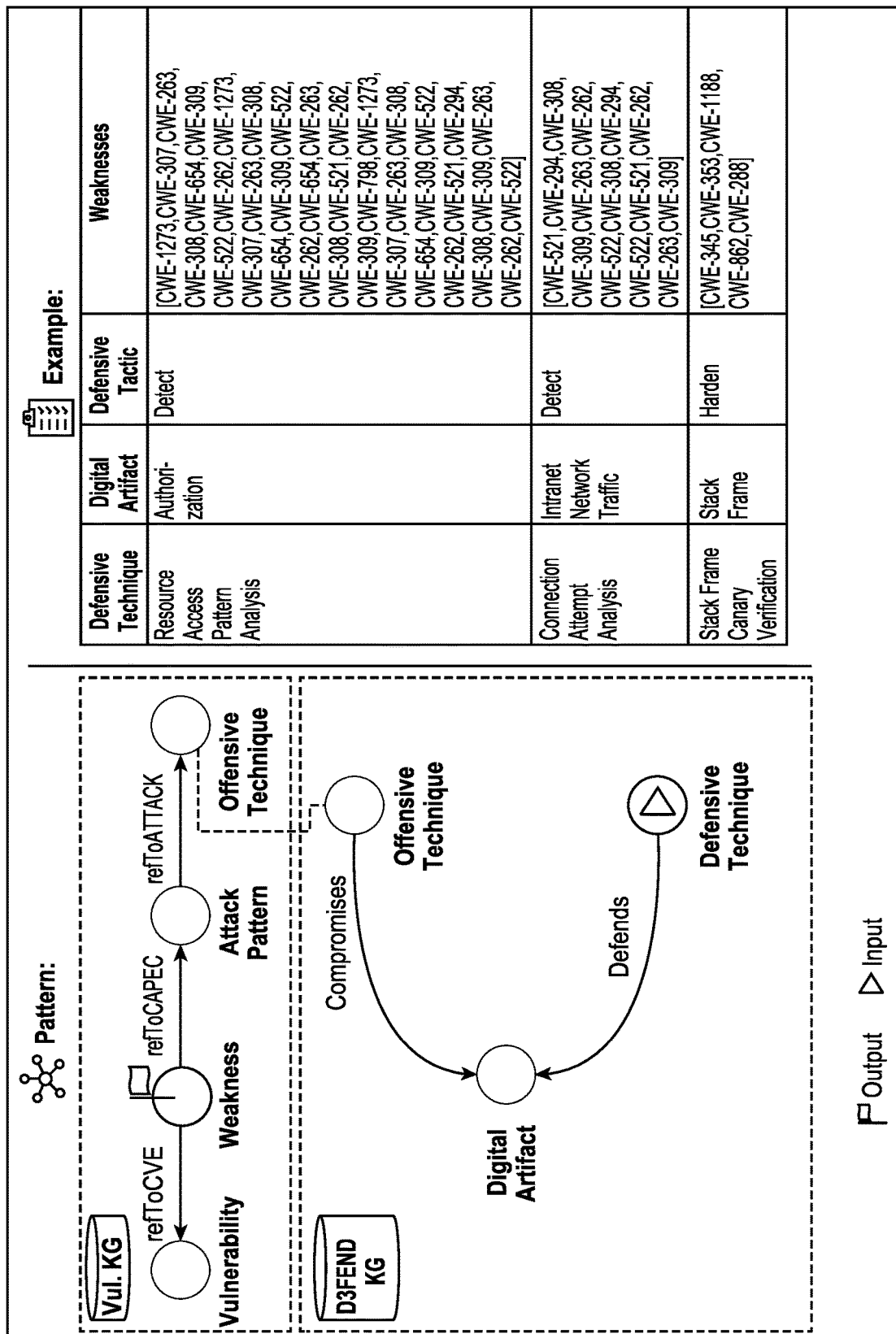

The example of FIG. 10 represents a use case of prioritization of security controls using analysis of CWE coverage per D3FEND countermeasure. In the example of FIG. 10, an application security findings report 712 in the application security knowledge graph database 714 includes a defensive technique. The analytical engine 716 obtains the application security findings report 712 and uses the SMESH 305 to output an enriched findings report 720 including relevant defensive techniques (resource access pattern analysis, connection attempt analysis, stack frame canary verification), digital artifacts (authorization, intranet network traffic, stack frame), defensive tactic (Detect, Detect, Harden), and weaknesses (CWEs).

As introduced above, implementations of the present disclosure provide for self-evolvement of the knowledge mesh, which reflected by a reasoning engine that learns historical data and able to complete missing links and entities. With regard to missing links, non-limiting examples can include: association between vulnerabilities and weaknesses (CVE to CWE), association between weaknesses and attack patterns (CWE to CAPEC), and association between attack patterns to attack techniques (CAPEC to ATT&CK). The task of adding missing entities to SMESH includes adding new objects to a knowledge graph and inferring its links. For example, adding missing attack techniques (as MITRE ICS or ATLAS) and infer associations with countermeasures and digital artifacts. Further, implementations of the present disclosure provide multiple directions to apply information completion. Non-limiting examples include NLP techniques to associate object descriptions, topological link prediction (e.g., https://neo4j.com/docs/graph-data-science/current/algorithms/linkprediction/) and node embedding (https://arxiv.org/abs/2002.00819) approaches, and logical inference, for example, using SWRL (https://www.w3.org/Submission/SWRL/).

Due to the decentralized nature of CVE reporting and generation, there are often incomplete, incorrect, or overly broad fields in the descriptive fields for the CVE. Misaligned fields can affect the quickness and quality of responses to newly released or detected vulnerabilities, in the case of incomplete or incorrect fields, breaking automation processes built around them. In the case of incorrect or overly broad CWE fields, the quality of response and remediation to the CVE can be affected.

An example can be provided in the context of vulnerability remediation. A team at an organization may be responsible for remediating vulnerabilities found based on vulnerability reporting. When a vulnerability is report generated, the team attempts to enrich the CVE information with CWE information to provide context related to the steps needed to remediate the vulnerability. The CWE information for a CVE in public datasets may be missing. Additionally or alternatively, the CWE information that is present may be overly broad. For example, a CWE can be assigned that describes a broader class of weaknesses as opposed to a more specific and precise CWE. Both of these use cases affect the quality of the response, decreasing either the quickness (by breaking the enrichment automation processes and/or forcing the remediation analyst to research the vulnerability more in depth) or decreasing the quality (presenting poor or incorrect information about the vulnerability that once again forces the remediation analyst to do more research). The techniques can be used to provide a CWE based on a textual vulnerability description.

Figure 11:
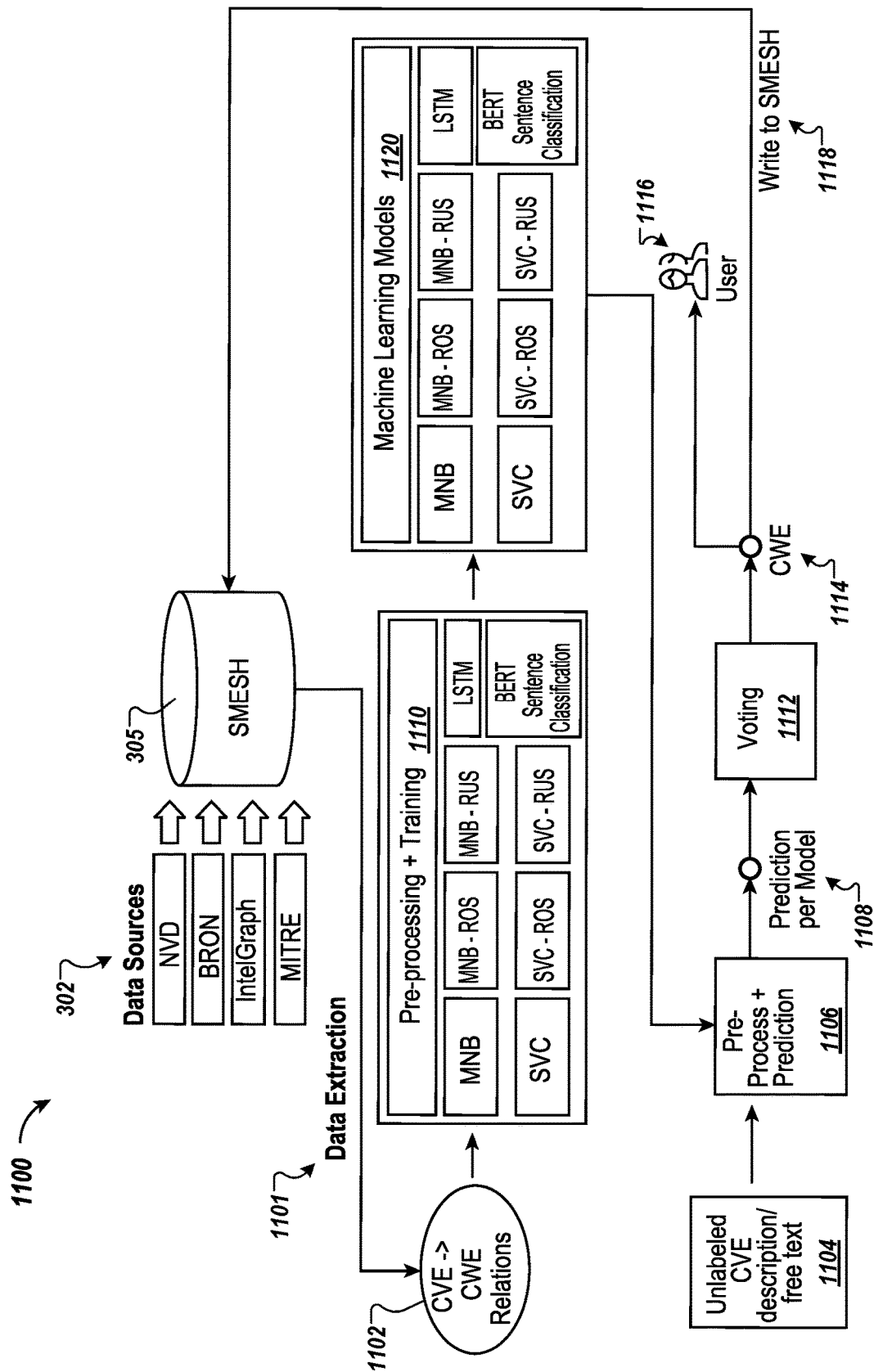
FIG. 11 depicts an example system for vulnerability classification.

A vulnerability can be a weakness in the computational logic (e.g., code) found in software and hardware components that, when exploited, results in a negative impact to confidentiality, integrity, or availability. Mitigation of the vulnerabilities in this context typically involves coding changes, but could also include specification changes or even specification deprecations (e.g., removal of affected protocols or functionality in their entirety). The purpose of CVE is to uniquely identify vulnerabilities and to associate specific versions of code bases (e.g., software and shared libraries) to those vulnerabilities. The use of CVEs ensures that two or more parties can confidently refer to a CVE identifier (ID) when discussing or sharing information about a unique vulnerability. CWE is a community-developed list of software and hardware weakness types. It serves as a common language, a measuring stick for security tools, and as a baseline for weakness identification, mitigation, and prevention effort FIG. 11 depicts an example system 1100 for vulnerability classification. Vulnerability description classification can be performed using the SMESH 305. As described above, the SMESH 305 is a knowledge mesh, with an underlying data federation architecture, and set of methods that enable its self-evolvement. SMESH modules 420 are used for vulnerability description classification. Specifically, referring back to Table 1, the vulnerability classification is performed using the vulnerabilities and products and weakness KG modules of the SMESH, including the CVE and CWE data.

This process obtains, as input, a vulnerability description or CVE description 1104 and returns the most relevant CWE. The process considers CWE as the CVE category. Various models (e.g., machine learning models 1120) can be pre-processed and trained 1110 for this task. To train the models, data is extracted 1101 from the SMESH 305. The extracted data can include CVE-CWE relations 1102 that indicate vulnerabilities and associated weaknesses. Each of machine learning models can have an accuracy ranging from, for example, seventy percent to ninety-five percent.

Table 2, below, provides an example mapping of each model to a respective cyber-security repository (data source 302).

TABLE 2

Example Trained Models

| Trained Model | Description |
| --- | --- |
| Fine-tuned BERT sentence classification | BERT (Bidirectional Encoder Representations from Transformers) is a publicly available langue model. There are publicly available models that solve predefined natural langue processing tasks (such as part of speech (POS) and name entity recognition (NER)) utilizing BERT model. "Hugging face" library holds a trained BERT sentence classification model, that its task is sentiment analysis. The model is fine-tuned over data to solve the CVE description classification. |
| Multinomial Bayes (MNB) | This approach uses the bag-of-words method along with lemmatization and TF-IDF on the raw CVE description text to convert individual words into features and train a Multinomial Bayes classification model with the CWE category as the response. |
| Multinomial Bayes Oversampling (MNB - ROS) | This approach uses the bag-of-words method along with lemmatization and TF-IDF on the raw CVE description text to convert individual words into features and train a Multinomial Bayes classification model with the CWE category as the response. The training set is augmented to address class imbalance using a SMOTE Oversampling on individual CWE Classes |
| Multinomial Bayes Under-sampling (MNB - RUS) | This approach uses the bag-of-words method along with lemmatization and TF-IDF on the raw CVE description text to convert individual words into features and train a Multinomial Bayes classification model with the CWE category as the response. The training set is augmented to address class imbalance using a SMOTE Under-sampling on individual CWE Classes |
| Linear SVC | This approach uses the bag-of-words method along with lemmatization and TF-IDF on the raw CVE description text to convert individual words into features and train a Linear SVC classification model with the CWE category as the response. |
| Linear SVC Oversampling (SVC - ROS) | This approach uses the bag-of-words method along with lemmatization and TF-IDF on the raw CVE description text to convert individual words into features and train a Linear SVC classification model with the CWE category as the response. The training set is augmented to address class imbalance using a SMOTE Oversampling on individual CWE Classes |
| Linear SVC Under-Sampling (SVC - RUS) | This approach uses the bag-of-words method along with lemmatization and TF-IDF on the raw CVE description text to convert individual words into features and train a Linear SVC classification model with the CWE category as the response. The training set is augmented to address class imbalance using a SMOTE Under-sampling on individual CWE Classes |
| LSTM | This Approach builds a training set of sequences of words extracted from the CVE descriptions to train a LSTM model with the CWE category as the response. |

The trained machine learning models 1120 are saved and queried in the online prediction phase. During the online prediction phase, the system 1100 performs unlabeled CVE classification. Unlabeled CVE classification includes obtaining a CVE description 1104 (or general vulnerability description) and returning the relevant CWE 1114, by using the trained models 1120. In some examples, the CVE description 1104 includes free text and/or a natural language description of a CVE.

The system 1100 performs pre-processing and prediction 1106. Pre-processing includes obtaining a vulnerability description and data, and converting the vulnerability description and data to machine learning (ML) model input format. In some examples, the vulnerability description includes a textual description of the vulnerability and a severity score. Prediction 1106 includes using the trained models to predict the relevant CWEs per model 1108. For example, prediction can include providing a vulnerability as input to each of the machine learning models 1120, and receiving a predicted weaknesses corresponding to the vulnerability as output from each of the machine learning models 1120.

The system 1100 performs voting 1112. Voting 1112 includes obtaining the description and the recommended CWE from every model. In some examples, voting 1112 includes determining which predicted weaknesses is output from a greater number of machine learning models than any other predicted weakness. In response, the system 1100 selects the predicted weakness as corresponding to the input vulnerability. This process returns the majority voting CWE as the recommended CWE 1114. In some examples, the recommended CWE 1114 can be output for presentation to a user 1116, such as a cyber-security expert. In some examples, the recommended CWE 1114 can be written 1118 to the SMESH 305.

The system 1100 is able to classify a CVE to a concrete CWE, instead of or in addition to a CWE category. The system is able to classify a free text description of a cyber-security finding to a concrete CWE. The system 1100 handles the task as a supervised classification problem. The system performs voting among multiple models with different architectures.

Figure 12:
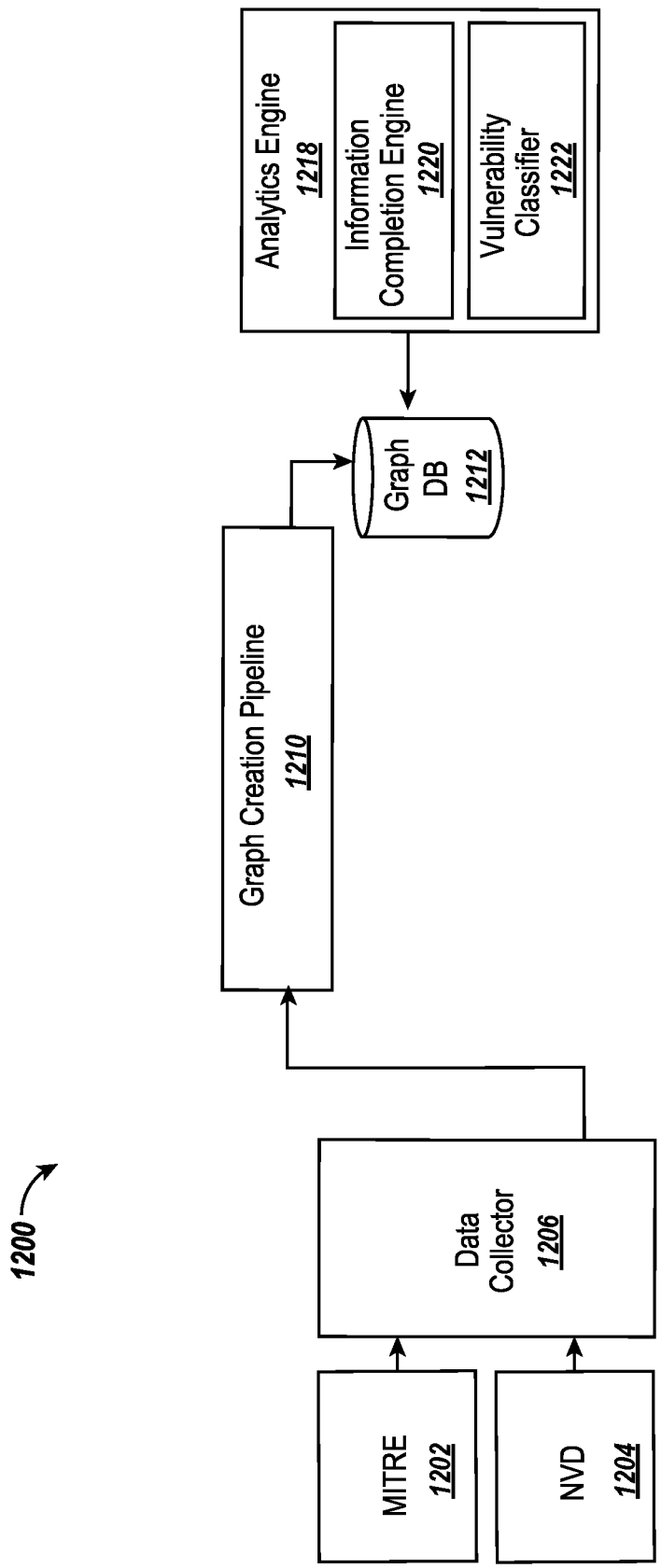
FIG. 12 depicts an example system for graph creation.

FIG. 12 depicts an example system 1200 for graph creation. The graph creation system 1200 includes a data collector 1206 that collects information from multiple data sources such as MITRE 1202 and NVD 1204. The system 1200 creates a single instance of a knowledge graph. Table 3, below, provides example data sources that can be used for graph creation.

TABLE 3

Data Sources

| Concept | Description | Data source |
|---|---|---|
| Vulnerabilities[6] | CVE: This repository enumerates the known security vulnerabilities by CVE (Common Vulnerabilities and Exposures) id and entry. For each CVE the entry contains the following data: textual description, severity score (CVSS), references and CPE (NVD) and CWE (MITRE) relations. | NVD: National Vulnerability Database (NVD) |
| Weaknesses[7] | CWE: Common Weakness Enumeration is a list of software and hardware weakness types. CWE assign relations between the different existing CWE entries, for example 'parentOf', 'peerOf', etc. In addition, each CWE entry contains its own textual description, CWE group membership, examples of related CVEs, and related attack pattern, CAPEC. | MITRE |
| Attack patterns[8] | CAPEC: provides a comprehensive dictionary of known patterns of attack employed by adversaries to exploit known weaknesses in cyber-enabled capabilities. | |
| ATT&CK[9] framework | ATT&CK: a globally-accessible knowledge base of adversary tactics and techniques based on real-world observations. The ATT&CK knowledge base is used as a foundation for the development of specific threat models and methodologies in the private sector, in government, and in the cyber-security product and service community. | |

[6]https://nvd.nist.gov/vuln
[7]https://cwe.mitre.org/
[8]https://capec.mitre.org/
[9]https://attack.mitre.org/

In some examples, the BRON[10] open-source project can be used as a data collector 1206. BRON is a knowledge graph combining data from several data sources such as ATT&CK, CAPEC, CWE, CVE ENGAGE and D3FEND. From BRON, one can query the links between CWE to CVE, CAPEC to ATT&CK, CWE to CAPEC and as a result CWE to CAPEC to ATT&CK. BRON is used as an input, and missing parts can be completed by an analytics engine 1218. The analytics engine 1218 includes a vulnerability classifier 1222 that performs vulnerability classification.

The analytics engine 1218 includes an information completion engine 1220 that performs automatic information completion. Information completion can include generating connections between nodes of knowledge graphs maintained by the same or different modules of a knowledge mesh. Information completion can be performed to increase coverage over all references in the knowledge graphs of the knowledge mesh. This can result in a more complete knowledge mesh provided by the SMESH 305. A more complete knowledge mesh results in greater accuracy when performing analysis using the SMESH 305. For example, accuracy can be improved when using the SMESH 305 to generate an enriched findings report 720, as describe with reference to FIG. 7. Additionally, accuracy can be improved when using the SMESH 305 to train machine learning models 1120 to predict weaknesses, as described with reference to FIG. 11.

Building atop cyber-security data collected by BRON project, up to date cyber-security findings can be collected in the following manner. BRON's collection and digestion can be performed, which parses cyber threat information, including CVE, CWE, CAPEC and attack techniques, which can be provided by sources such as MITRE and NIST. The data can be collected in an intermediate database, Arango DB.

The data stored in Arango can be consumed by a simple query. The data can be digested and converted to a different form, for storing it in a Neo4j database. This can be done by mapping Arango's data structures to Neo4j's Cypher query language. Once the digestion is complete, a whole knowledge graph containing the CVE, CWE, CAPEC, attack techniques and provided relationships, is available for further analysis and inferencing.

Performance considerations require handling the data in batches and introducing indexes in the database. Similarly, supporting the ever-growing scale in terms of data volume and velocity, a cloud-based solution can be employed to enables streaming the data to a graph database 1212, such as a Neo4j database, for later use.

Figure 13A:
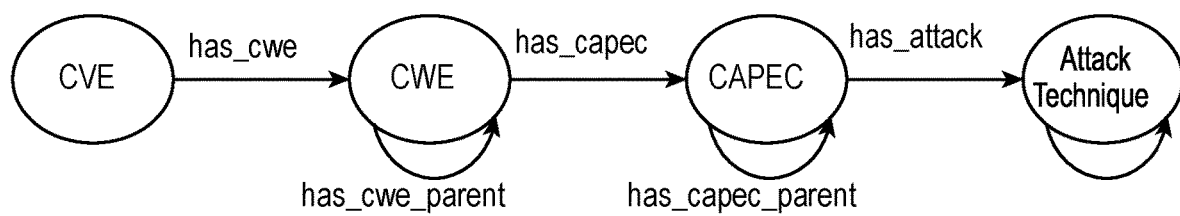
FIG. 13A-C depict example graphs of vulnerabilities to attack techniques.
Figure 13B:
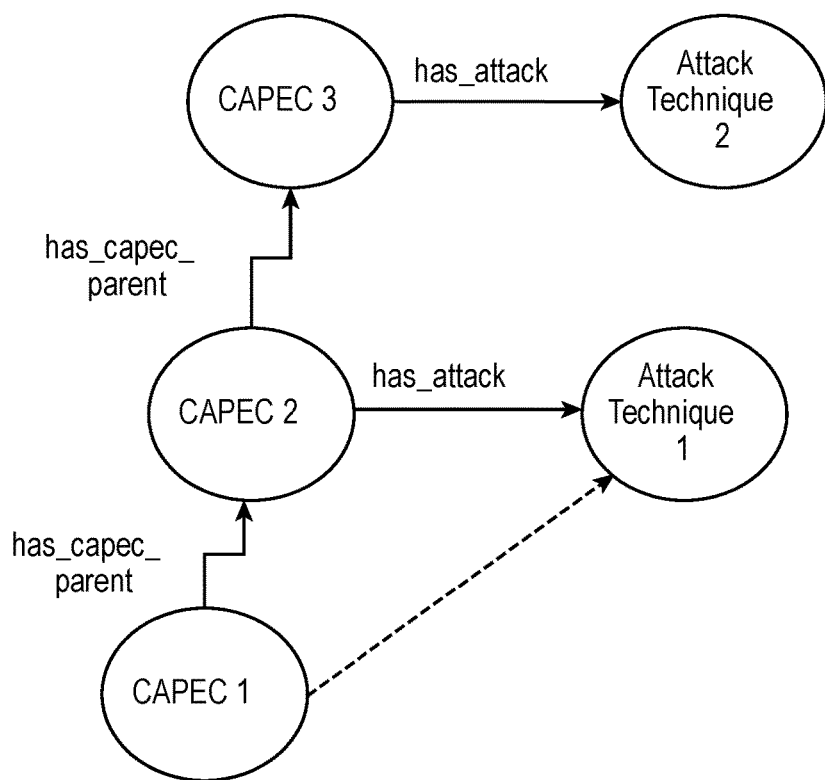
Figure 13C:
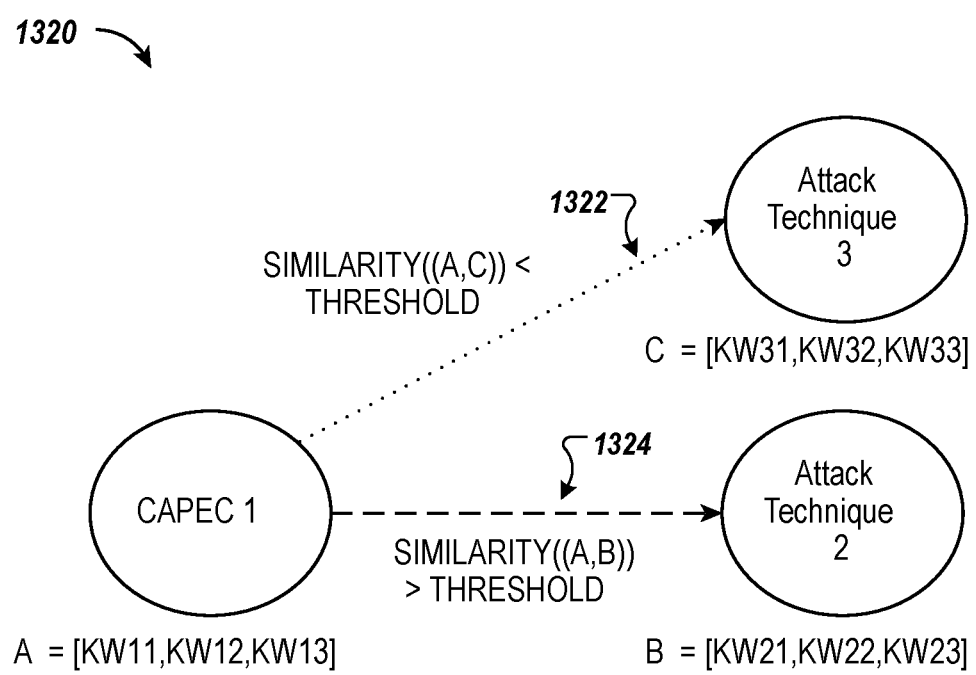

FIGS. 13A-C depict example graphs of vulnerabilities to attack techniques. FIG. 13A shows an example graph schema 1300 for a graph created by the graph creation pipeline 1210 of FIG. 12. A graph can be composed of concepts and relations. In some examples, links, or connections, in the graph may be missing. This reduces the probability to successfully retrieve a complete path through the knowledge mesh from a vulnerability to an attack technique. The initial coverage of an example graph is as follows: 62% for CVE to CWE; 35% for CWE to CAPEC; 16% for CAPEC to ATTACK. An improved coverage of an example graph, after information completion processes are performed is as follows: 72% for CVE to CWE; 85% for CWE to CAPEC; 66% from CAPEC to ATTACK.

In order to increase coverage, multiple different processes can be implemented for link prediction. A first process includes inheritance based inference. FIG. 13B depicts an example graph 1310 demonstrating inheritance-based inference. Inheritance-based inference completes the missing link or missing links from the closest parent node of a child node. This represents the child node inheriting the weaknesses of the parent node, if the child node does not already have any links to weaknesses.

Inheritance-based inference can be performed, for example, for the following links: CAPEC to ATT&CK, CWE to CAPEC. For example, if a connection exists between a CWE node and an attack pattern node, the child node of the CWE node inherits the relation to the attack pattern node. In the example graph 1310, inheritance-based inference will create a link between "CAPEC 1" and "ATTACK TECHNIQUE 1" which is linked to "CAPEC 2" which is the closest parent of "CAPEC 1."

Another process that can be used to increase coverage is NLP classifier-based inference. NLP classifier-based inference can use the text-to-CWE model described with reference to FIG. 11 to complete missing links between CVEs and CWEs using free text descriptions of CVEs.

Another process that can be used to increase coverage is NLP-based object matching inference, as depicted in FIG. 13C. NLP-based object matching inference can be used to infer missing links, e.g., when inheritance based inference and NLP classifier-based inference cannot infer the missing links for all entities. Object-matching inference can be performed, for example, for the following links: CAPEC to ATT&CK, CWE to CAPEC.

In some examples, to perform NLP-based object matching inference, a vector can be generated for the description of each entity. For example, a vector can be generated for the description of a CWE, and for the description of attack patterns. The vector representing the CWE description can be compared to the vectors of the attack patterns to determine the similarity of the vectors. When the similarity of the vector description of two nodes is above a predefined threshold, the information completion engine 1220 generates a connection between the two nodes.

In some examples, keywords are extracted from each source entity description. Extracted keywords of the source entity are matched with the extracted keywords of all the target entity candidates by calculating the causal similarity of the list of keywords tuples. In some examples, a link is created between entities for which the similarity between them is above a predefined threshold. In the example of FIG. 13C, a dotted line 1322 represents a case where a connection will not be created, due to the similarity being less than a threshold value. A dashed line 1324 represents a case where a connection will be created, due to the similarity being greater than the threshold value.

In some examples, the information completion engine 1220 can perform information completion in a designated sequence. For example, the information completion engine 1220 can first perform an inheritance-based inference completion process on a KG, then perform NLP classifier-based inference process on the KG to generate connections for nodes that are missing connections. The information completion engine 1220 can then perform a similarity-based completion process on the KG to generate connections for nodes that are still missing connections.

The analytics engine 1218 includes a vulnerability classifier 1222 that performs vulnerability classification. Vulnerability classification can be performed to correlate findings to attack techniques. In this way, cyber-security issues can be translated to cyber-security threats. The cyber-security issues can then be grouped, assigned, and/or prioritized. In some examples, automated actions are performed based on the identification and prioritization of cyber-security issues. The automated actions can be performed to reduce the cyber-security risk to the network.

Figure 14:
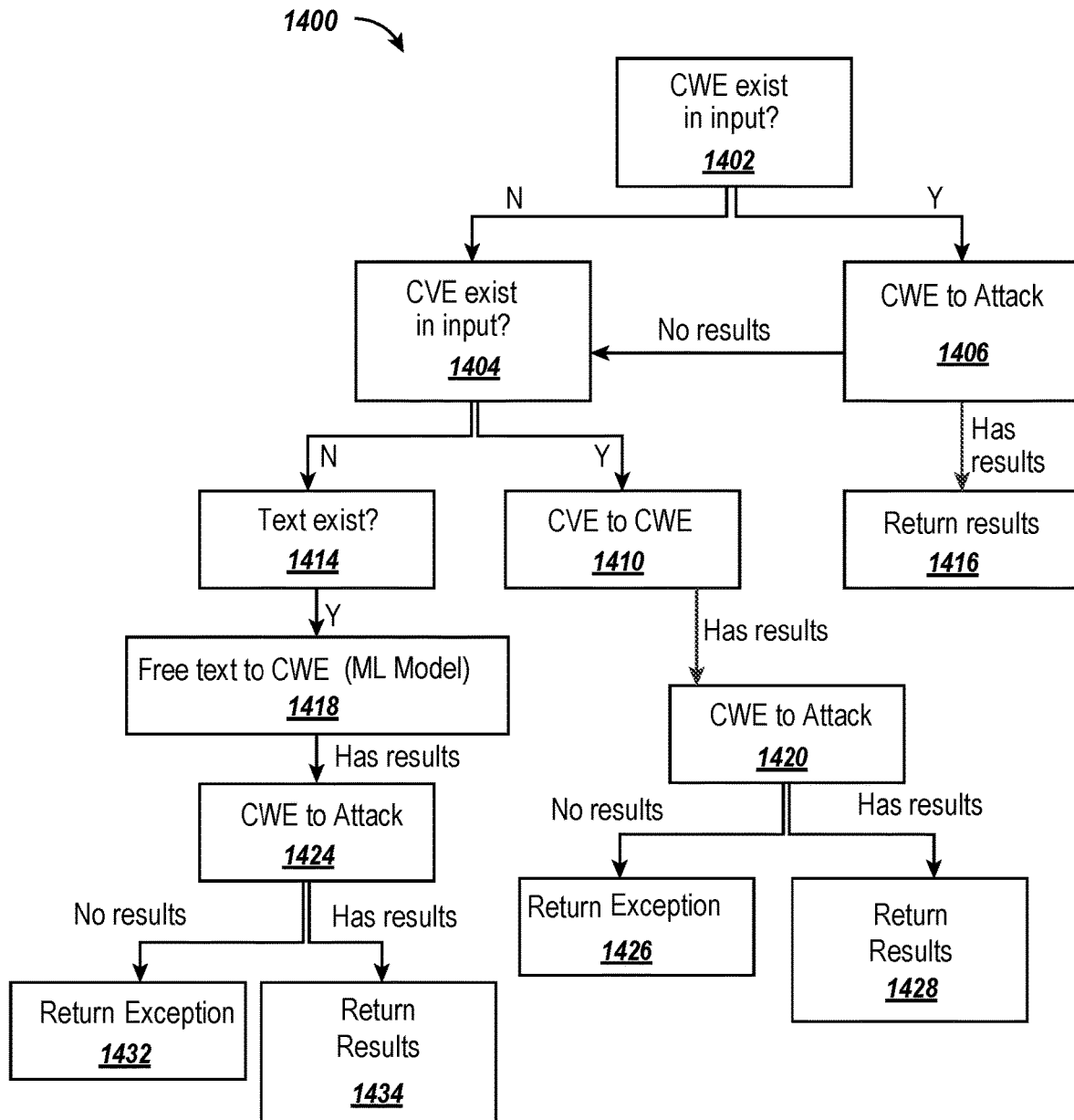
FIG. 14 depicts an example flow diagram of a process for identifying attack methods.

FIG. 14 depicts an example flow diagram 1400 of a process for identifying attack methods from weaknesses. The process 1400 can be performed, for example, by the vulnerability classifier 1222.

The process 1400 includes obtaining input 1402. The input can include a triplet <CWE_ID, CVE_ID, text>. The process 1400 includes checking if the input includes CWE ID. If yes, the CWE to Attack 1406 process is used to identify connections from CWE to Attack 1406. The CWE ID is obtained as input, and all paths to related ATT&CK techniques are returned 1416 by querying a knowledge graph.

If a CWE ID does not exist in the input, or if the CWE to Attack 1406 utility returns no results, the vulnerability classifier 1222 determines whether a CVE exists in the input 1404. If a CVE exists in the input, the vulnerability classifier 1222 identifies connections from CVE to CWE 1410. If results are returned, the vulnerability classifier 1222 identifies connections from CWE to Attack 1420, similar to identifying connections from CWE to Attack 1406 as described above. All paths to related ATT&CK techniques are returned 1428. If there are no paths, an exception 1426 is returned.

IF CVE does not exist in the input, the vulnerability classifier 1222 determines whether text is included 1414 in the input. If text is included in the input, the vulnerability classifier 1222 identifies connections from free text to CWE 1418, using one or more machine learning models. This process obtains a textual description of a vulnerability and returns the relevant CWE ID, by using a pre-trained text to CWE ML model. The process can use the text-to-CWE model described with reference to FIG. 11 to complete missing links between CVEs to CWEs. Once the relevant CWE ID is identified, the CWE to Attack 1424 process can be performed to obtain results 1434. If no text is included, an exception 1432 is returned.

In an example, a text is received as input provided by a user. The input includes text stating "When a User forgets their password they use the forget password form. This form is protected using a CSRF [Cross-Site Request Forgery] token. The CSRF token used for resetting a user's password is not validated by the server, hence a CSRF with an empty CSRF Token field will results in a successful CSRF attack." The vulnerability classifier 1222 determines at step 1402 that no CWE exists in the input. The vulnerability classifier 1222 determines at step 1404 that no CVE exists in the input. The vulnerability classifier 1222 determines at step 1414 that text exists in the input. Thus, the vulnerability classifier 1222, at step 1418, uses the text-to-CWE model, shown in FIG. 11, to classify the weakness. The text-to-CWE model outputs a predicted CWE of CWE-352: Cross-Site Request Forgery (CSRF). The vulnerability classifier 1222, at step 1424, finds a path from the CWE to relevant attack tactics.

In another example, the following input is received from a user:
classify—cve CVE-2018-19838-t "Denial of Service (DoS)—Affecting node-sass package, versions <4.11.0" specifies a CVE of CVE-2018-19838.

Based on the input, the vulnerability classifier 1222 find a classification result for input:
{'cve': ['CVE-2018-19838'], 'cwe': [ ], 'description_text': 'Denial of Service (DoS)—Affecting node-sass package, versions <4.11.0'}

The vulnerability classifier 1222 determines at step 1402 that no CWE exists in the input. The vulnerability classifier 1222 determines at step 1404 that a CVE does exist in the input. The vulnerability classifier 1222 maps the CVE to CWE at step 1410 using CVE-CWE relations extracted from the SMESH 305. The vulnerability classifier 1222, at step 1420, finds a path from CWE to relevant attack tactics. The vulnerability classifier 1222 returns results 1428. The results can include an attack technique (e.g., ATT&CK Technique T1499: Endpoint Denial of Service), and a path to the attack technique including a CAPEC (e.g., CAPEC 492: Regular Expression Exponential Blowup), a CWE (e.g., CWE 400: Uncontrolled Resource Consumption), and a CVE (e.g., CVE-2018-19838). In some examples, the results are provided to a user through text presented on a display of a computing device.

The disclosed techniques use a hybrid AI approach to infer the missing links (logical inference & ML model-based inference). The hybrid AI approach of deep learning and logical inferencing methods is used in information completion tasks. The system is able to classify any cyber-security issue which described by a free text to an adversarial technique. An NLP solution maps a free text to CVE to increase the coverage. Knowledge graph, Inheritance inference and NLP based inference techniques are used for mapping. Additional knowledge bases can be used to increase the coverage. Any cyber-security issue that is described as a free text can automatically be classified.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method for reducing cyber-security risk, comprising:
    selecting one or more modules for inclusion in a knowledge mesh, wherein each module is associated with a respective aspect and maintains a knowledge graph specific to the respective aspect, wherein each knowledge graph is generated using data from one or more cyber-security repositories and includes nodes and connections between the nodes;
    receiving a query corresponding to a first node of a first knowledge graph included in the knowledge mesh;
    generating a response to the query by identifying connections between the first node of the first knowledge graph and at least one node of at least one other knowledge graph included in the knowledge mesh; and
    identifying, based on the response to the query, one or more actions to reduce cyber-security risk.

2. The method of claim 1, wherein:
    the first knowledge graph is maintained by a first module, and
    generating a response to the query by identifying connections between the first node of the first knowledge graph and at least one node of at least one other knowledge graph included in the knowledge mesh comprises:
        identifying a connection between the first node of the first knowledge graph maintained by the first module and a second node of a second knowledge graph maintained by a second module.

3. The method of claim 1, wherein:
    the first knowledge graph is maintained by a first module, and
    generating a response to the query by identifying connections between the first node of the first knowledge graph and at least one node of at least one other knowledge graph included in the knowledge mesh comprises:
        identifying matching entities between the first knowledge graph maintained by the first module and a second knowledge graph maintained by a second module.

4. The method of claim 1, comprising performing the one or more actions to reduce cyber-security risk.

5. The method of claim 1, comprising:
    extracting, from the knowledge mesh, data indicating vulnerabilities and associated weaknesses; and
    training, using the extracted data, a plurality of machine learning models to predict weaknesses from input vulnerabilities.

6. The method of claim 5, comprising:
    providing, as input to the plurality of machine learning models, a vulnerability; and
    receiving, as output from each of the plurality of machine learning models, a predicted weakness corresponding to the vulnerability.

7. The method of claim 6, comprising:
    determining, based on the output from each of the plurality of machine learning models, that a particular predicted weakness is output from a greater number of machine learning models than any other predicted weakness; and in response, selecting the particular predicted weakness as corresponding to the vulnerability.

8. The method of claim 5, wherein the data indicating vulnerabilities includes, for each vulnerability, a textual description and a severity score.

9. The method of claim 1, wherein receiving a query corresponding to the first node of the first knowledge graph included in the knowledge mesh comprises:

receiving, as input, at least one of a weakness identifier, a vulnerability identifier, or a textual description of a vulnerability.

10. The method of claim 9, wherein generating a response to the query by identifying connections between the first node of the first knowledge graph and at least one node of at least one other knowledge graph included in the knowledge mesh comprises:

using the at least one of the weakness identifier, vulnerability identifier, or textual description of the vulnerability, determining an attack technique.

11. The method of claim 1, wherein an aspect of a module includes vulnerabilities, weaknesses, attack patterns, adversary tactics, countermeasure, cloud resources, or threat intelligence.

12. The method of claim 1, wherein the first node of the knowledge graph represents one of a weakness or a vulnerability.

13. The method of claim 1, wherein the at least one node of the at least one other knowledge graph included in the knowledge mesh represents one of: a weakness, a vulnerability, an attack technique, an attack tactic, an attack pattern, a threat, a defensive technique, a defensive tactic, a digital artifact, a digital object, or a digital event.

14. A system comprising:
one or more computers; and
one or more storage devices storing instructions that are operable, when executed by the one or more computers, to cause the one or more computers to perform operations comprising:
selecting one or more modules for inclusion in a knowledge mesh, wherein each module is associated with a respective aspect and maintains a knowledge graph specific to the respective aspect, wherein each knowledge graph is generated using data from one or more cyber-security repositories and includes nodes and connections between the nodes;
receiving a query corresponding to a first node of a first knowledge graph included in the knowledge mesh;
generating a response to the query by identifying connections between the first node of the first knowledge graph and at least one node of at least one other knowledge graph included in the knowledge mesh; and
identifying, based on the response to the query, one or more actions to reduce cyber-security risk.

15. The system of claim 14, wherein:
the first knowledge graph is maintained by a first module, and
generating a response to the query by identifying connections between the first node of the first knowledge graph and at least one node of at least one other knowledge graph included in the knowledge mesh comprises:
identifying a connection between the first node of the first knowledge graph maintained by the first module and a second node of a second knowledge graph maintained by a second module.

16. The system of claim 14, wherein:
the first knowledge graph is maintained by a first module, and
generating a response to the query by identifying connections between the first node of the first knowledge graph and at least one node of at least one other knowledge graph included in the knowledge mesh comprises:
identifying matching entities between the first knowledge graph maintained by the first module and a second knowledge graph maintained by a second module.

17. The system of claim 14, the operations comprising performing the one or more actions to reduce cyber-security risk.

18. The system of claim 14, the operations comprising:
extracting, from the knowledge mesh, data indicating vulnerabilities and associated weaknesses; and
training, using the extracted data, a plurality of machine learning models to predict weaknesses from input vulnerabilities.

19. The system of claim 18, the operations comprising:
providing, as input to the plurality of machine learning models, a vulnerability; and
receiving, as output from each of the plurality of machine learning models, a predicted weakness corresponding to the vulnerability.

20. A non-transitory computer-readable medium storing software comprising instructions executable by one or more computers which, upon such execution, cause the one or more computers to perform operations comprising:
selecting one or more modules for inclusion in a knowledge mesh, wherein each module is associated with a respective aspect and maintains a knowledge graph specific to the respective aspect, wherein each knowledge graph is generated using data from one or more cyber-security repositories and includes nodes and connections between the nodes;
receiving a query corresponding to a first node of a first knowledge graph included in the knowledge mesh;
generating a response to the query by identifying connections between the first node of the first knowledge graph and at least one node of at least one other knowledge graph included in the knowledge mesh; and
identifying, based on the response to the query, one or more actions to reduce cyber-security risk.

* * * * *